United States Patent
Nagaraja

(10) Patent No.: US 10,949,743 B2
(45) Date of Patent: Mar. 16, 2021

(54) METHOD AND SYSTEM FOR IMPLEMENTING REINFORCEMENT LEARNING AGENT USING REINFORCEMENT LEARNING PROCESSOR

(71) Applicant: ALPHAICS CORPORATION, Wilmington, DE (US)

(72) Inventor: Nagendra Nagaraja, Bangalore (IN)

(73) Assignee: ALPHAICS CORPORATION, Wilmington, DE (US)

( * ) Notice: Subject to any disclaimer, the term of this patent is extended or adjusted under 35 U.S.C. 154(b) by 839 days.

(21) Appl. No.: 15/720,723

(22) Filed: Sep. 29, 2017

(65) Prior Publication Data

US 2018/0260700 A1    Sep. 13, 2018

Related U.S. Application Data

(63) Continuation-in-part of application No. 15/659,501, filed on Jul. 25, 2017, which is a continuation-in-part of application No. 15/455,126, filed on Mar. 9, 2017, now Pat. No. 9,754,221.

(51) Int. Cl.
| | |
|---|---|
| *G06N 20/00* | (2019.01) |
| *G06N 3/08* | (2006.01) |
| *G06N 5/04* | (2006.01) |
| *G06N 7/00* | (2006.01) |
| *G06N 3/04* | (2006.01) |
| *G06N 3/00* | (2006.01) |
| *G06N 3/06* | (2006.01) |

(52) U.S. Cl.
CPC ............... *G06N 3/08* (2013.01); *G06N 3/004* (2013.01); *G06N 3/0445* (2013.01); *G06N 3/0454* (2013.01); *G06N 3/06* (2013.01); *G06N 5/043* (2013.01); *G06N 7/005* (2013.01); *G06N 20/00* (2019.01)

(58) Field of Classification Search
CPC ...................................................... G06N 20/00
USPC ................................................... 706/15, 45
See application file for complete search history.

(56) References Cited

U.S. PATENT DOCUMENTS

| | | | |
|---|---|---|---|
| 2004/0073764 A1* | 4/2004 | Andreasson | G06F 12/0253 711/170 |
| 2017/0205863 A1* | 7/2017 | Lee | G06F 1/324 |

* cited by examiner

*Primary Examiner* — David R Vincent
(74) *Attorney, Agent, or Firm* — Barry Choobin; Patent 360LLC

(57) ABSTRACT

The embodiments herein disclose a system and method for implementing reinforcement learning agents using a reinforcement learning processor. An application-domain specific instruction set (ASI) for implementing reinforcement learning agents and reward functions is created. Further, instructions are created by including at least one of the reinforcement learning agent ID vectors, the reinforcement learning environment ID vectors, and length of vector as an operand. The reinforcement learning agent ID vectors and the reinforcement learning environment ID vectors are pointers to a base address of an operations memory. Further, at least one of said reinforcement learning agent ID vector and reinforcement learning environment ID vector is embedded into operations associated with the decoded instruction. The instructions retrieved by agent ID vector indexed operation are executed using a second processor, and applied onto a group of reinforcement learning agents. The operations defined by the instructions are stored in an operations storage memory.

19 Claims, 17 Drawing Sheets

| Fetch/Decode unit 14A | | Dispatch/Collect Unit 14B | | Fetch/Decode unit 14A | | Dispatch/Collect Unit 14B | |
|---|---|---|---|---|---|---|---|
| ALU | ALU | ALU | ALU | ALU | ALU | ALU | ALU |
| Learning/ Inferencing Context | | Learning/ Inferencing Context | | Learning/ Inferencing Context | | Learning/ Inferencing Context | |
| Learning/ Inferencing Context | | Learning/ Inferencing Context | | Learning/ Inferencing Context | | Learning/ Inferencing Context | |

| Core ID | Context ID | Thread ID |
|---|---|---|

FIG. 1C

| EnvID | AgentID | CoreID | ContextID | ThreadID |
|---|---|---|---|---|

FIG. 1D

METHOD AND SYSTEM FOR IMPLEMENTING REINFORCEMENT LEARNING AGENT USING REINFORCEMENT LEARNING PROCESSOR

CROSS-REFERENCE TO RELATED APPLICATIONS

This application is the Continuation-in-part of the U.S. continuation-in-part Application with Ser. No. 15/659,501 filed on Jul. 25, 2017 with the title "SYSTEM AND METHOD FOR TRAINING ARTIFICIAL INTELLIGENCE SYSTEMS USING A SIMA BASED PROCESSOR" and also claims the priority of the U.S. Non-Provisional Patent Application with Ser. No. 15/455,126, filed on Mar. 9, 2017, with the title "PROCESSOR FOR IMPLEMENTING REINFORCEMENT LEARNING OPERATIONS". The contents of abovementioned applications are included entirely as reference herein.

BACKGROUND

Technical Field

The embodiments herein relates to the field of reinforcement learning. Particularly, the embodiments herein relates to a processor specifically configured for implementing reinforcement learning operations, and an application-domain specific instruction set (ASI) comprising instructions corresponding to reinforcement learning operations.

Description of the Related Art

Artificial Intelligence (AI) aims at making a computer or a computer-controlled robot, or computer implemented software program to mimic the thought process of a human brain. AI is used in various computer implemented applications including gaming, natural language processing, creation and implementation of expert systems, creation and implementation of vision systems, speech recognition, handwriting recognition, and robotics. A computer/computer controlled robot/computer implemented software program achieves AI through learning, reasoning, perception, problem-solving and linguistic intelligence.

Machine learning is a branch of artificial intelligence (AI) that provides computers the ability to learn without necessitating explicit functional programming. Machine learning emphasizes on the development of (artificially intelligent) learning agents that could change their actions and state dynamically and appropriately when exposed to a new set of data. Reinforcement learning is a type of machine learning where a reinforcement learning agent learns through the feedback from a surrounding environment in each entered state. The reinforcement learning agent traverses from one state to another by the way of performing an appropriate action at every state, thereby receiving an observation/feedback and a reward from the environment, in addition to traversing from the state. The objective of a Reinforcement Learning (RL) system is to maximize the reinforcement learning agent's total reward in an unknown environment, through a learning process that warrants the reinforcement learning agent to traverse between multiple states while receiving feedback and reward at every state, in response to an action performed at every state.

Further, essential elements of a reinforcement learning system include policy, reward functions, and state-value functions. A policy typically defines a framework for interaction between the reinforcement learning agent and a corresponding reinforcement learning environment. Typically, the actions undertaken by the reinforcement learning agent and the states traversed by the reinforcement learning agent during an interaction with a reinforcement learning environment, are governed by the policy. When an action is undertaken, the agent moves within the environment from one state to another and quality of a state-action combination defines an action-value function. The action-value function ($Q\pi$) determines an expected utility of an (preferably selected) action. The reward function informs the agent about the current actions, states, and rewards received at each state. Typically, rewards are provided directly by the environment, but values are estimated and re-estimated from the sequences of observations an agent makes over its entire lifetime. Thus, a reinforcement learning algorithm aims to estimate state-value function.

Q-learning is one of the techniques employed to perform reinforcement learning. In Q-learning, the agent attempts to learn the optimal policy from the agent's history of interaction with the environment. The agent learns to carry out actions in the environment to maximize reward achieved or minimize the costs incurred. Q-learning estimates the action-value function that further provides the expected utility of taking a given action in a given state and following the optimal policy thereafter. Thus, by finding the optimal policy, the agents can perform actions to achieve maximum rewards.

Existing methods disclose the use of neural networks (by the reinforcement learning agents) to determine the action to be performed in response to the observation/feedback. Neural networks are machine learning models that employ one or more layers of nonlinear units to predict an output for a received input. Each layer of the network generates an output from a received input in accordance with current values of a respective set of parameters. However, existing methods do not disclose processor architectures specifically configured to perform reinforcement learning operations. Furthermore, existing methods that promote the use of neural networks do not support reward function approximation.

To implement the function of deep reinforcement learning, and AI application, existing systems typically use GPUs. GPUs typically incorporate Single Instruction Multiple Data (SIMD) architecture to execute reinforcement learning operations. In SIMD, all the GPUs share the same instruction but perform operations on different data elements. However, the GPUs require a large amount of processing time to extract actionable data. Further, GPUs are unsuitable for sequential decision-making tasks and are hindered by a lack of efficiency as far as processing the memory access of reinforcement learning tasks is concerned.

Therefore, in order to overcome the drawbacks discussed hitherto, there is a need for a processor architecture specifically designed for implementing reinforcement learning operations/tasks. Further, there is also a need for a processor architecture that enables in programming reinforcement learning agents. Further, there is also a need for a processor architecture that incorporates an application-domain specific instruction set, processor cores and memory architecture specifically designed for performing reinforcement learning tasks/operations and implementing reinforcement learning agents.

OBJECTS

An object of the embodiments herein is to provide a processor architecture that enables to implement reinforcement learning agents.

Another object of the embodiments herein is to provide an effective alternative to general purpose processor architecture such as scalar and vector Single Instruction Multiple Data (SIMD) and Single Instruction Multiple threads (SIMT).

Yet another object of the embodiments herein is to provide a processing architecture (processor) that is tailor made for effective and efficient implementation of reinforcement learning agents and reward functions.

Yet another object of the embodiments herein is to provide an instruction set which is specifically designed for executing tasks/operations pertinent to reinforcement learning.

Yet another object of the embodiments herein is to provide an application domain specific instruction set that could be simultaneously executed across multiple reinforcement learning agents and reinforcement learning environments (Single Instruction Multiple Agents (SIMA)).

Yet another object of the embodiments herein is to provide an application domain specific instruction set capable of performing value finction approximation and reward function approximation, by the way of training a neural network.

Yet another object of the embodiments herein is to provide an application domain specific instruction set and a processor architecture optimized for implementation of reinforcement learning tasks/operations.

Yet another object of the embodiments herein is to provide an application domain specific instruction set and a processor architecture that provides for a single instruction to be simultaneously applied upon multiple reinforcement learning agents.

Yet another object of the embodiments herein is to provide an application domain specific instruction set and a processor architecture that creates an effective balance between exploration and exploitation of a reinforcement learning environment.

Yet another object of the embodiments herein is to provide an effective solution to the 'curse of dimensionality' typically witnessed high-dimensional data analysis scenarios.

Yet another object of the embodiments herein is to provide an application domain specific instruction set and a processor architecture that enables parallel learning and effective sharing of learning, amongst a plurality of reinforcement learning agents.

Yet another object of the embodiments herein is to provide a processor architecture that necessitates fewer clock cycles in comparison to the conventional CPU/GPU, to implement reinforcement learning operations/tasks.

Yet another object of the embodiments herein is to provide an application domain specific instruction set and a processor architecture that renders comparatively larger levels of abstraction, during the implementation of reinforcement learning operations/tasks.

SUMMARY

In order to overcome the drawbacks discussed hitherto, the embodiments herein envisages a processor architecture specifically designed to implement reinforcement learning agents. The processor architecture provides rich actionable data for scientific computing, cloud computing, robots, and IOT computing inter-alia. The processor architecture includes a first processor (host processor), a first memory module (IRAM), a Complex Instruction fetch and decode (CISFD) unit, a second processor (Reinforcement learning processor), and a second memory module. The host processor is configured to create at least one reinforcement learning agent and at least one reinforcement learning environment. Further, the host processor assigns an agent ID and environment ID to the reinforcement learning agent and the reinforcement learning environment respectively.

In accordance with the embodiments herein, the IRAM is coupled to the host processor and is configured to store an application-domain specific instruction set (ASI). The application-domain specific instruction set (ASI) includes instructions optimized for implementing reinforcement learning agents. The instructions include at least one of the reinforcement learning agent ID vector and the reinforcement learning environment ID vector as an operand. The CISFD unit is configured to fetch upto 'N' instructions simultaneously for decoding. The CISFD unit generates a plurality of threads, for example, r-thread, v-thread, q-thread, and a-thread, corresponding to a decoded instruction. Each of the threads are embedded with either the reinforcement learning agent ID or reinforcement learning environment ID (depending upon the corresponding instruction). The threads corresponding to the decoded instruction are transmitted to the reinforcement learning processor. The threads are executed in parallel using a plurality of processing cores of the reinforcement learning processor. In an example, if 'N' is the number of processor cores, then 'N' instructions are fetched by CISFD for simultaneous execution.

In accordance with the embodiments herein, each processor core includes a plurality of execution units. Further, each execution unit includes a fetch/decode unit, dispatch/collect unit, and a plurality of registers for storing learning context and inferencing context corresponding to a reinforcement learning agent. The fetch/decode unit is configured to fetch the threads corresponding to the decoded instruction. Subsequently, the execution unit performs ALU operations corresponding to the threads, on the registers storing the learning context and the inferencing context. The results (of the execution of threads) are generated based on the learning context and inferencing context stored in the registers. Subsequently, the results are transmitted to the collect/dispatch unit, which stores the results (of the execution of threads) in predetermined partitions of a second memory module. In accordance with the embodiments herein, subsequent to the execution of threads corresponding to a decoded instruction, action(s) (corresponding to the reinforcement learning agent), a state-value function, a Q-value, and a reward function are generated. The action, state-value function, Q-value, and reward function thus generated represent the interaction between the reinforcement learning agent and the corresponding reinforcement learning environment (either of which was specified as an operand in the instruction executed by the reinforcement learning processor).

According to an embodiment herein, a method for implementing reinforcement learning agents using a reinforcement learning processor is provided. According to an embodiment herein, at least one reinforcement learning agent and at least one corresponding reinforcement learning environment are created using a first processor. A reinforcement learning agent ID is assigned to said reinforcement learning agent. A reinforcement learning environment ID is assigned to said reinforcement learning environment. Further, an application-domain specific instruction set (ASI) is created. The application-domain specific instruction set comprises vector based instructions for implementing reinforcement learning agents and reward functions. Further, instructions are created by including at least one of the reinforcement learning agent ID vectors, the reinforcement learning environment ID vectors, and length of vector as an operand. The reinforcement learning agent ID vectors and the reinforcement learning environment ID vectors are pointers to a base address of an operations memory. Thereafter, at least one of said instructions is fetched using a complex instruction fetch and decode (CISFD) unit, and said instruction is decoded. An agent vector is fetched from memory. Further, at least one of said reinforcement learning agent ID vector and reinforcement learning environment ID vector is embedded into operations associated with the decoded instruction. Subsequently, the instructions retrieved by agent ID vector indexed operation are executed using a second processor, and the corresponding instruction is applied onto a group of reinforcement learning agents. A group of reinforcement learning environments is identified respectively by said reinforcement learning agent ID vector and reinforcement learning environment ID vector embedded in the instruction. Further, an action, a state-value function, a Q-value and a reward value are determined based on execution of the instruction corresponding to the operation. The operations defined by the instructions are stored in an operations storage memory, wherein operations storage memory is a second memory.

According to an embodiment herein, the step of creating an application-domain specific instruction set (ASI), further includes the step, the instructions for programmable agent implementation defined by operations are included into the ASI, and wherein each agent is defined as a series of operation types. Each operation type is defined by an instruction of the reinforcement learning processor comprising linear algebra vector instructions, simple scalar instructions and register based load/store operations. The step of creating an application-domain specific instruction set (ASI), Further includes the step of, the instructions for implementing reward functions as a series of operations are included into the ASI, and wherein reward functions are defined by a reward function ID in the reinforcement learning processor. The reward functions are associated to one of a reinforcement learning environment ID and reinforcement learning agent ID. The instructions are included for storing a micro code corresponding to a reward function into a second memory, represented by a reward function type, and a pointer to a base address of reward function ID in the operations memory. The step of creating an application-domain specific instruction set (ASI) is defined by a user-defined agent type, and a pointer to a base address of agent vector in the operations memory.

BRIEF DESCRIPTION OF THE ACCOMPANYING DRAWINGS

FIG. 1B is a block diagram illustrating an execution unit of the processor core, in accordance with the embodiments herein;

FIG. 1C is a block diagram illustrating the format of 'threadID', in accordance with the embodiments herein;

FIG. 1D is a block diagram illustrating the format for addressing the memory partitions of the second memory module, in accordance with the embodiments herein;

Figure 6A:
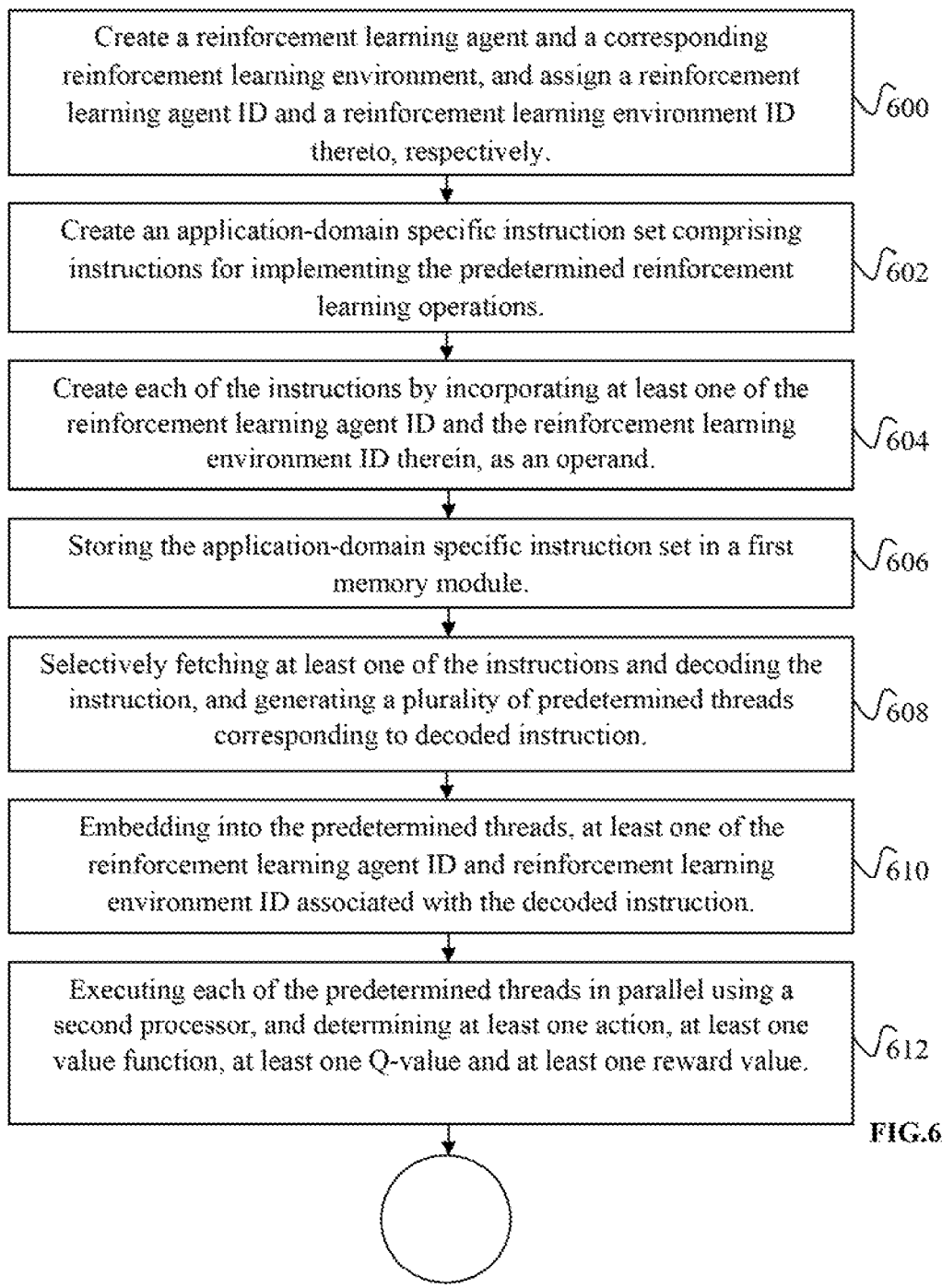
Figure 6B:
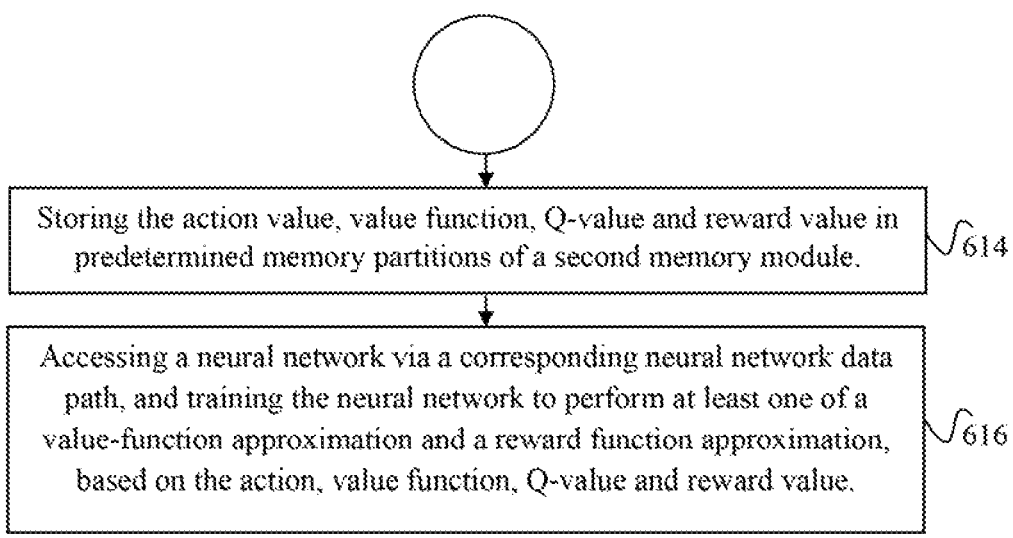
Figure 7A:
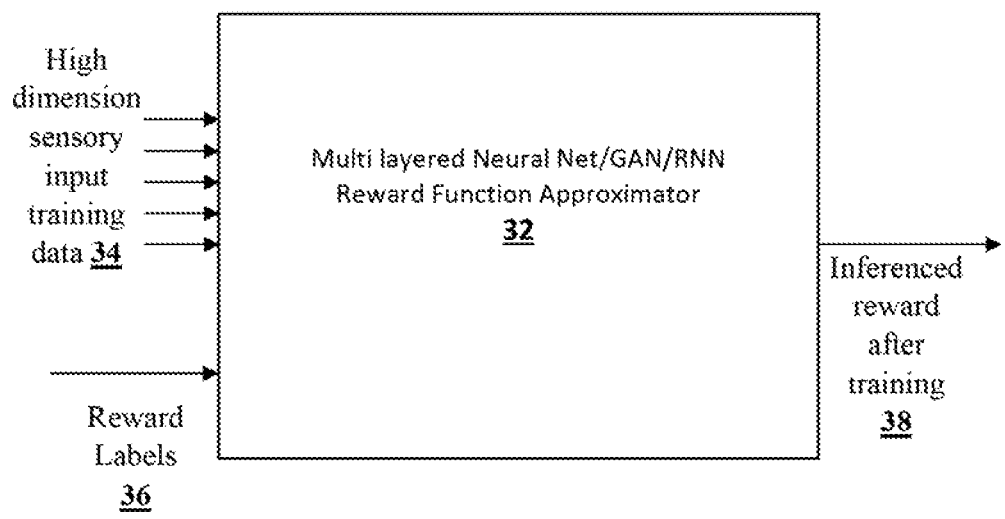
Figure 7B:
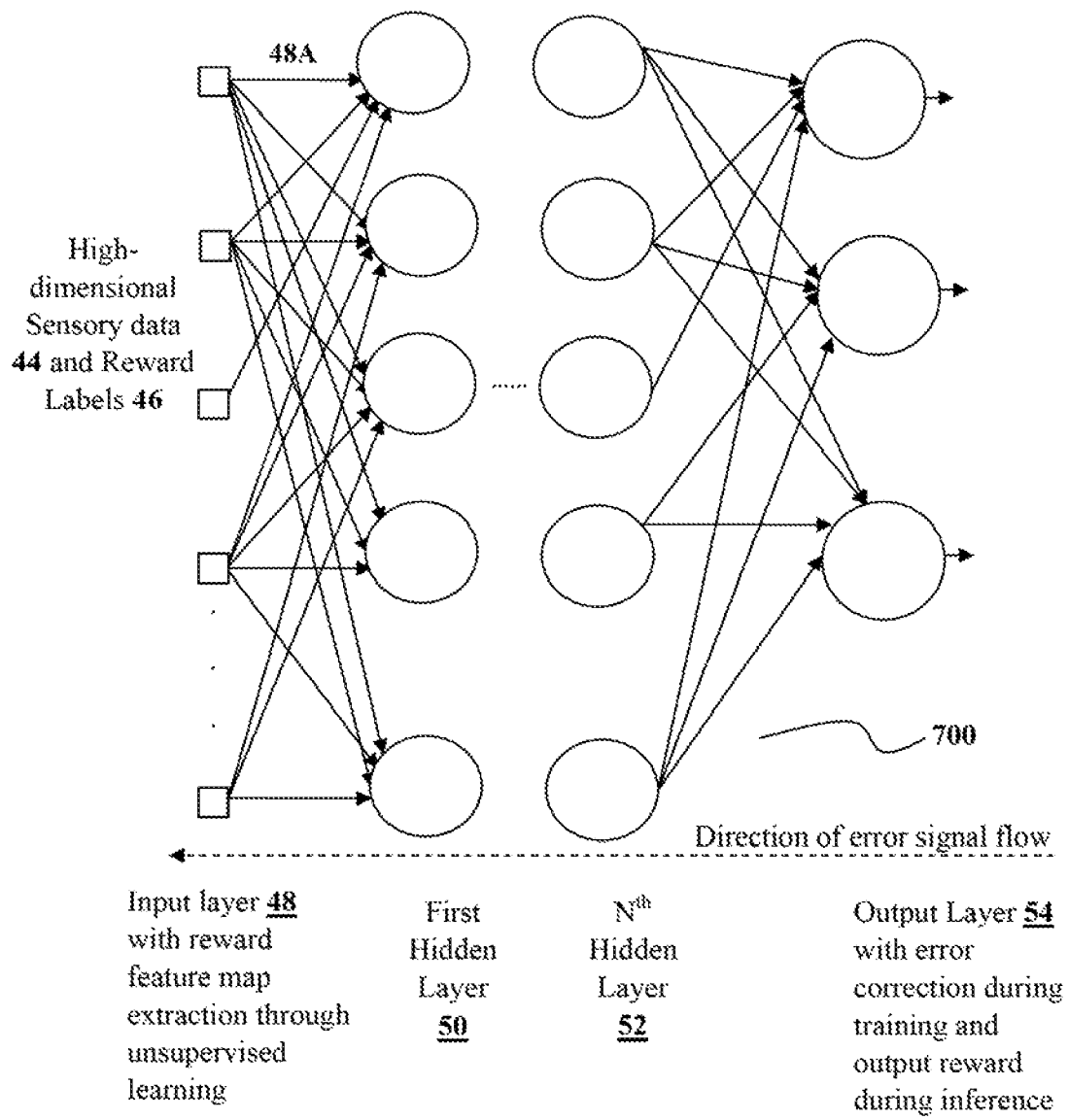
Figure 7C:
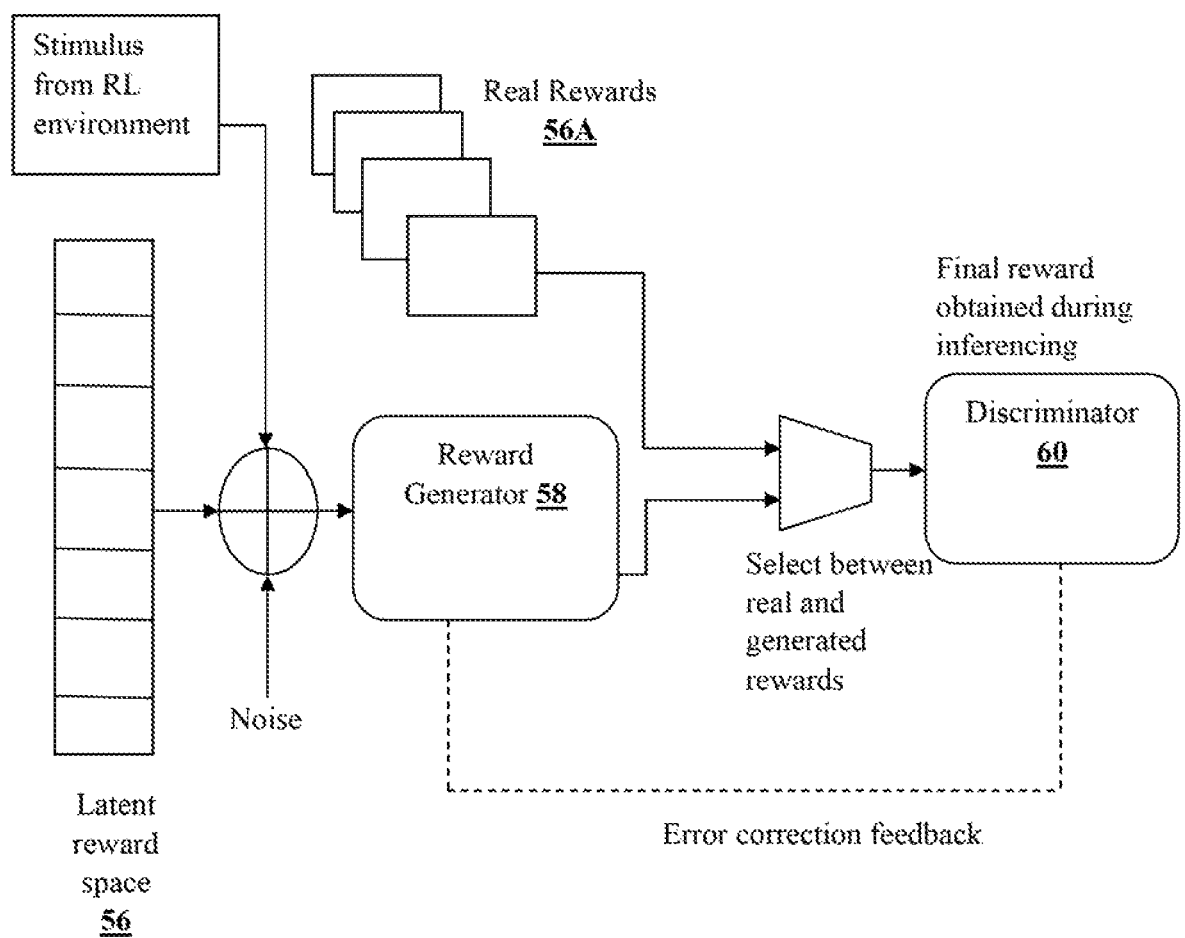

FIG. 6A and FIG. 6B in combination illustrate a flow-diagram explaining the steps involved in a method for implementing predetermined reinforcement learning using the reinforcement learning processor, in accordance with the embodiments herein;

FIG. 7A is a block diagram illustrating a reward function approximator, in accordance with the embodiments herein;

FIG. 7B is a block diagram illustrating an exemplary deep neural network implementing the reward function approximator described in FIG. 7A and FIG. 7C is a block diagram illustrating a Generative Adversarial Network (GAN), used for reward function approximation in accordance with the embodiments herein.

Figure 8:
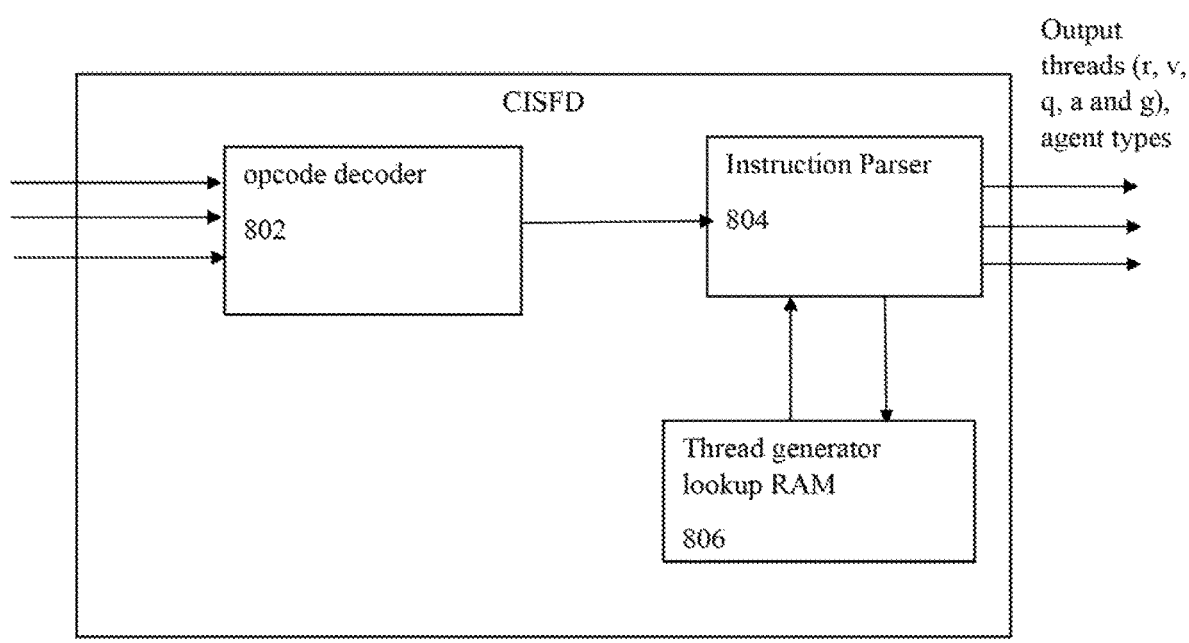

FIG. 8 illustrates a programmable CISFD generating thread blocks.

Figure 9:
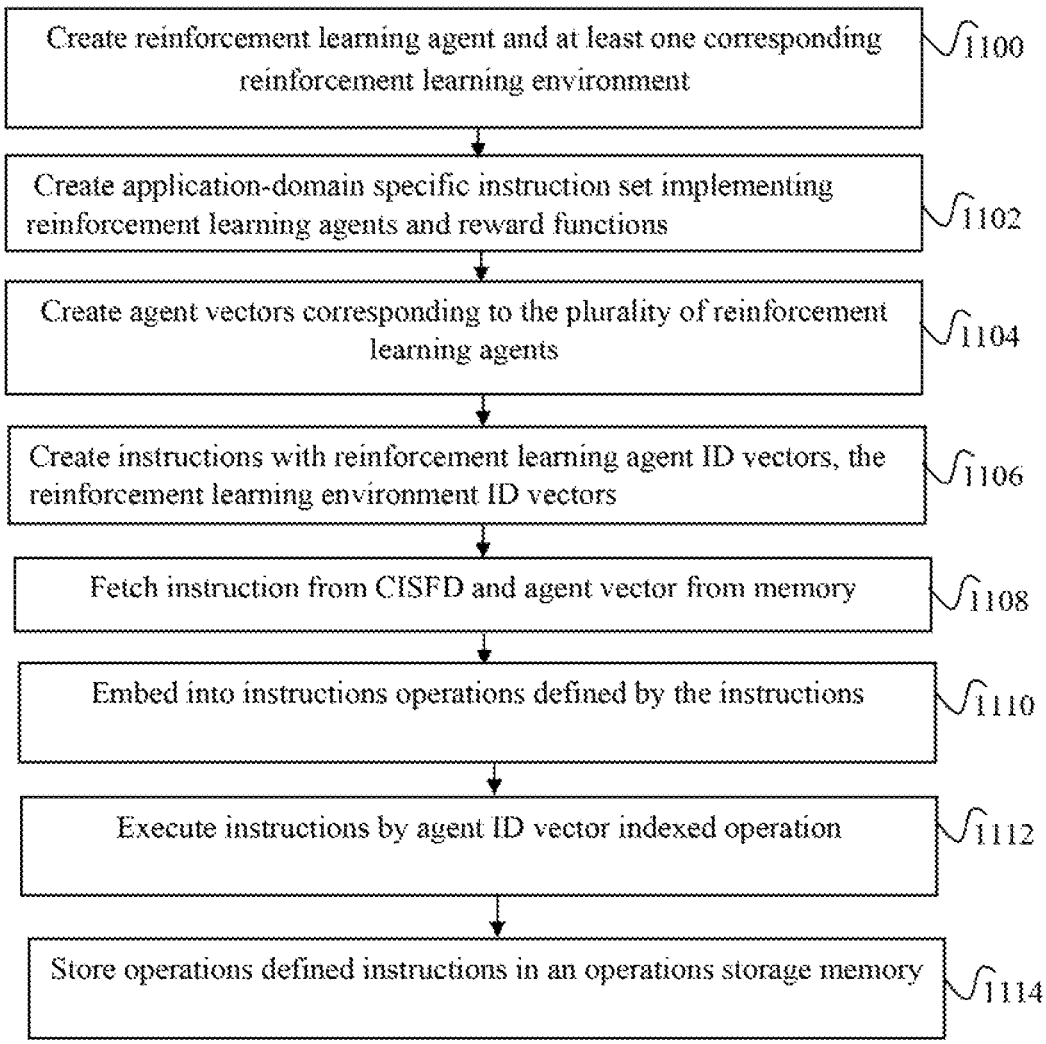
Figure 10:
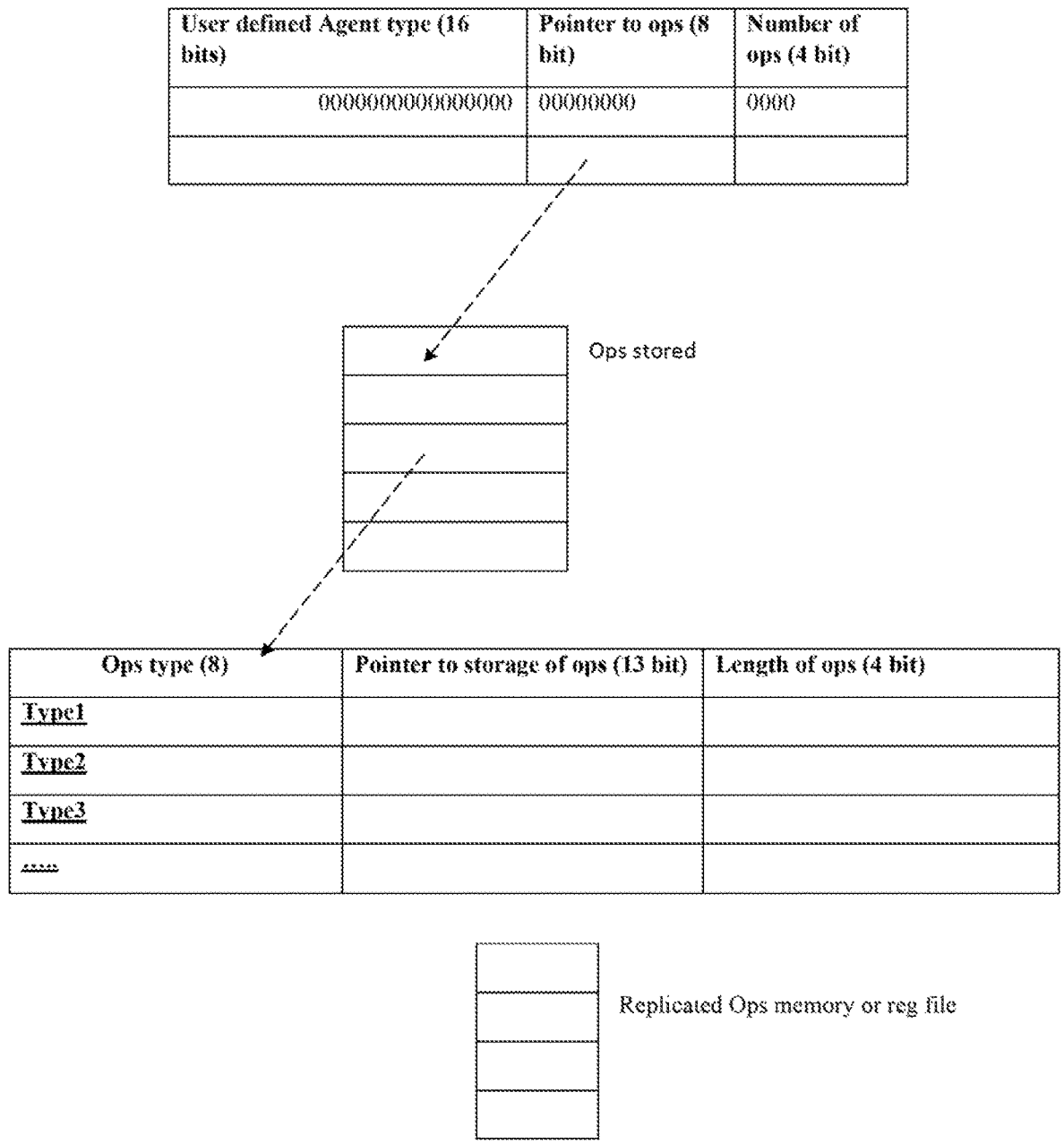

FIG. 9 is a flowchart illustrating a method for implementing reinforcement learning agents using a reinforcement learning processor FIG. 10 illustrates schematic block diagram of agent implementation by a reinforcement learning processor.

Figure 11:
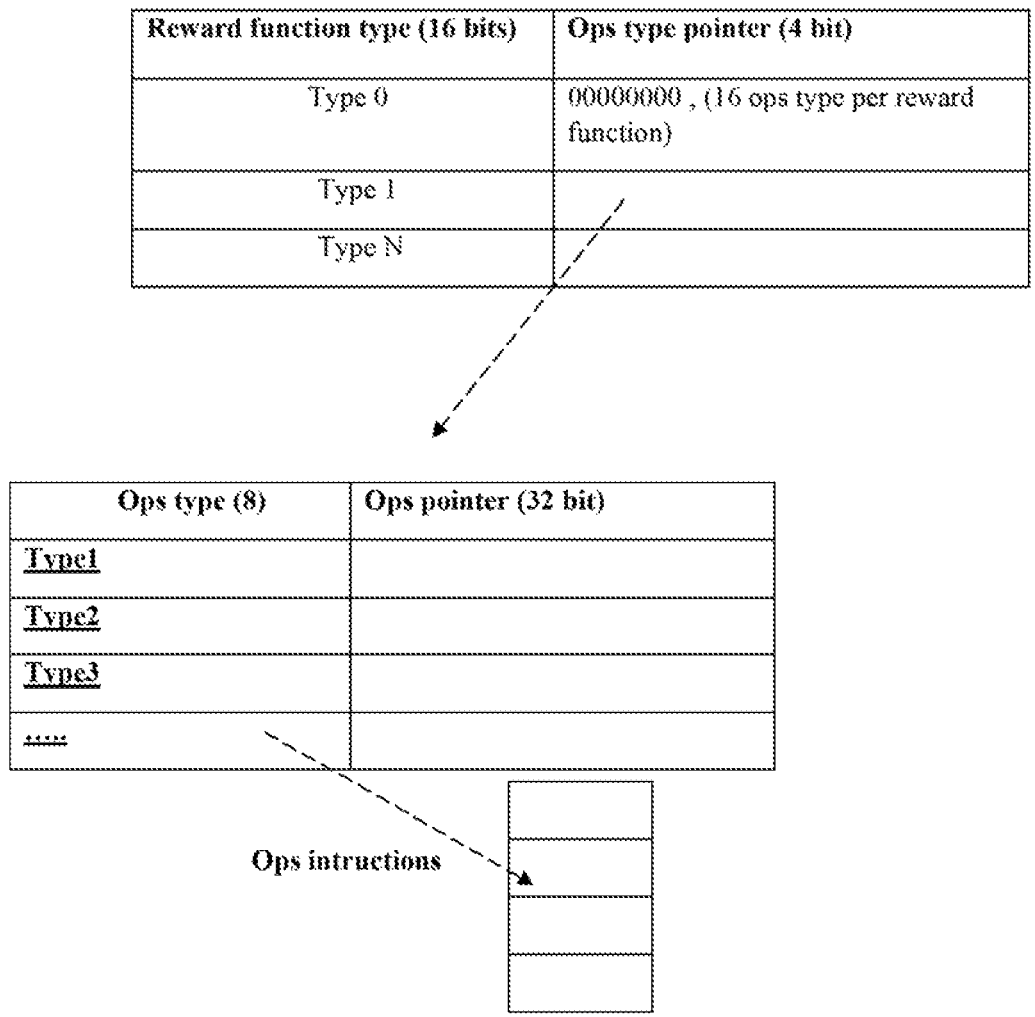

FIG. 11 illustrates schematic block diagram of reward function implementation by the reinforcement learning processor.

DETAILED DESCRIPTION

In view of the drawbacks discussed hitherto, there was felt a need for a processor that was specifically designed for and specialized in executing reinforcement learning operations. In order to address the aforementioned need, the embodiments herein envisages a processor that has been specifically configured (programmed) to execute reinforcement learning operations by the way of implementing an instruction set (an application-specific instruction set) which has been designed specifically to implement operations pertinent to reinforcement learning.

The embodiments herein envisages a processor specifically configured to implement reinforcement learning (termed as 'reinforcement learning processor' hereafter). The reinforcement learning processor is configured to execute an application-specific instruction set (ASI) which has also been designed to implement a plurality of predetermined reinforcement learning operations/tasks.

In accordance with the embodiments herein, the application-specific instruction set incorporates 'Single Instruction Multiple Agents (SIMA)' instructions. SIMA type are specifically designed to be implemented simultaneously on a plurality of reinforcement learning agents which in turn are interacting with one or more corresponding reinforcement learning environments. Further, the reinforcement learning processor envisaged by the embodiments herein, the SIMA type instructions when implemented by the reinforcement learning processor, cause the reinforcement learning processor to execute reinforcement learning operations on a plurality of reinforcement learning agents and a plurality of reinforcement learning environments simultaneously.

In accordance with the embodiments herein, the SIMA type instructions are specifically configured to receive either a reinforcement learning agent ID or a reinforcement learning environment ID as the operand. The reinforcement learning agent ID (RL agent ID) corresponds to a reinforcement learning agent, while the reinforcement learning environment ID (RL environment ID) corresponds to a reinforcement learning environment. The SIMA type instructions envisaged by the embodiments herein, when executed by the reinforcement learning processor perform predetermined reinforcement learning activities on either a reinforcement learning agent or a corresponding reinforcement learning environment.

In accordance with an exemplary embodiment of the embodiments herein, the SIMA type instructions incorporated in the application-specific instruction set, when executed by the reinforcement processor, trigger a reinforcement learning agent to interact with a corresponding reinforcement learning environment and further enable the reinforcement learning agent to explore the reinforcement learning environment and deduce relevant learning from the reinforcement learning environment. Additionally, SIMA type instructions also provide for the learnings deduced from the interaction between the reinforcement learning agent and the reinforcement learning environment, to be iteratively applied onto the reinforcement learning environment to deduce furthermore learning therefrom.

Further, the SIMA type instructions when executed by the reinforcement learning processor, also enable the reinforcement learning agent to exploit the learnings deduced from any previous interactions between the reinforcement learning agent and the reinforcement learning environment. Further, the SIMA type instructions also enable the reinforcement learning agent to iteratively exploit the learnings deduced from the previous interactions, in any of the subsequent interactions with the reinforcement learning environment. Further, the SIMA type instructions also provide for construction of a Markov Decision Process (MDP) and a Semi-Markov Decision Process (SMDP) based on an interaction between the corresponding reinforcement learning agent and the reinforcement learning environment.

Further, the SIMA type instructions also enable selective updating of the MDP and SMDP, based on the interactions between the corresponding reinforcement learning agent and the reinforcement learning environment. The SIMA type instructions, when executed by the reinforcement learning processor, also backup the MDP and SMDP. Further, the SIMA type instructions when executed on the reinforcement learning agent, enable the reinforcement learning agent to initiate a Q-learning procedure, and a deep-learning procedure and also associate a reward function in return for the Q-learning and the deep-learning performed by the reinforcement learning agent.

Further, the SIMA type instructions, upon execution by the reinforcement learning processor, read and analyze the 'learning context' corresponding to the reinforcement learning agent and the reinforcement learning environment. Further, the SIMA type instructions upon execution, determine an optimal Q-value corresponding to a current state of the reinforcement learning agent. Further, the SIMA type instructions also cause the reinforcement learning agent to perform generalized policy iteration, and also enable implementation of on-policy and off-policy learning methods upon the reinforcement learning agent. Further, the SIMA type instructions, upon execution, approximate a state-value function and a reward function, for the current state of the reinforcement learning agent. Further, the SIMA type instructions, when executed by the reinforcement learning processor, train at least one of a deep neural network (DNN) and a recurrent neural network (RNN) using a predetermined learning context, and trigger the deep neural network or the recurrent neural network for approximating at least one of a reward function and state-value function corresponding to the current state of the reinforcement learning agent.

Figure 1:
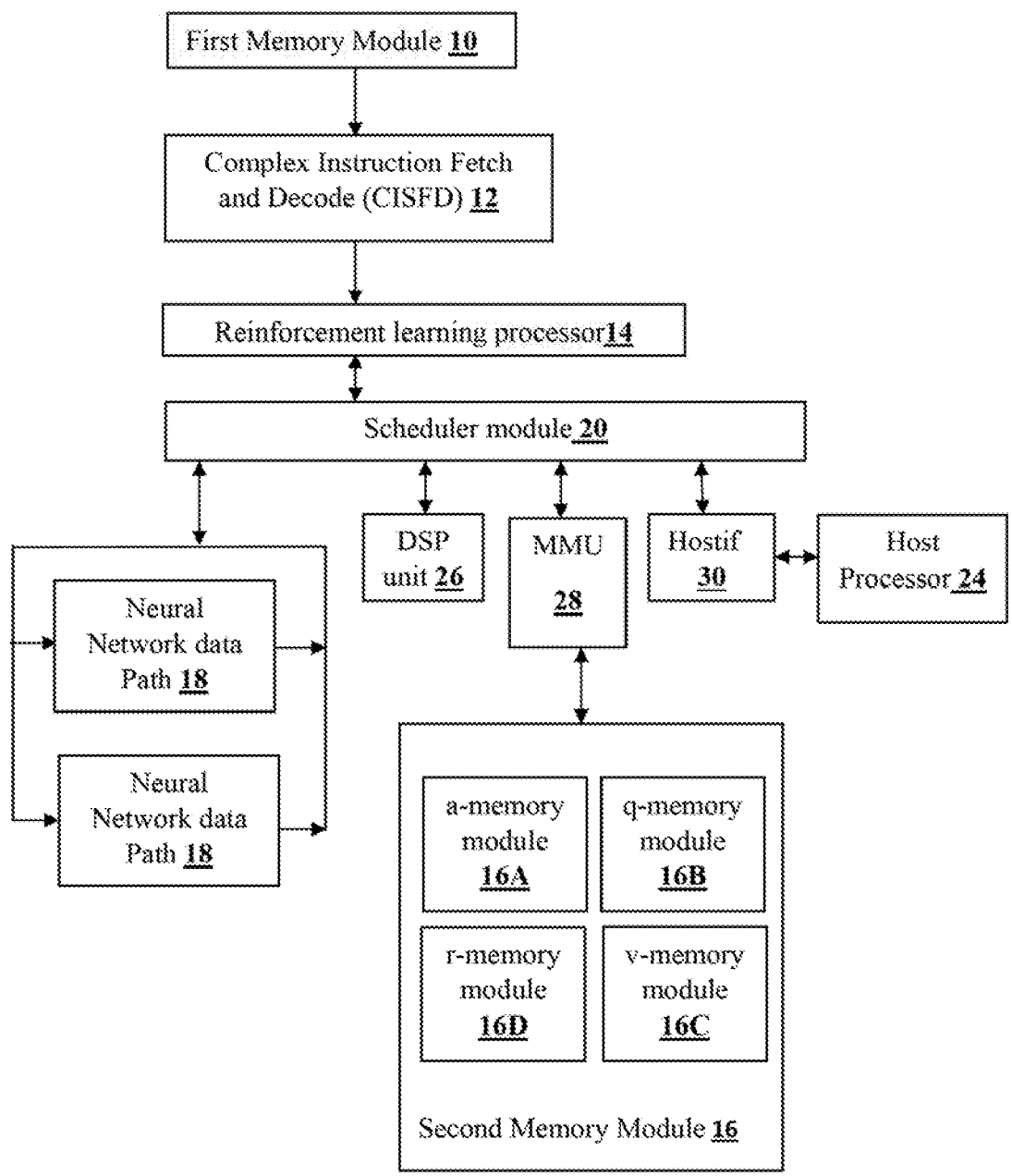
FIG. 1 is a block-diagram illustrating the components of the system for implementing predetermined reinforcement learning operations, in accordance with the embodiments herein.

Referring to FIG. 1, there is shown a block diagram illustrating the components of the system 100 for implementing the tasks/operations pertinent to reinforcement learning. The system 100, as shown in FIG. 1 includes a first memory module 10 (preferably an IRAM). The first memory module stores the application-specific instruction set (ASI), which incorporates the SIMA instructions (referred to as 'instructions' hereafter) for performing predetermined reinforcement learning tasks. The instructions incorporated into the ASI, as described in the above paragraphs, are configured to receive either a reinforcement learning agent ID or a reinforcement learning environment ID as the operand. The reinforcement learning agent ID represents a reinforcement learning agent (not shown in figures) trying to achieve a predetermined goal in an optimal manner by the way of interacting with a reinforcement learning environment (represented by reinforcement learning environment ID). Each of the instructions stored in the first memory module 10 are linked to corresponding 'opcodes'. The 'opcodes' corresponding to each of the instructions are also stored in the first memory module 10. Further, the first memory module 10 also stores the reinforcement learning agent ID and reinforcement learning environment ID corresponding to each of the reinforcement learning agents and the reinforcement learning environments upon which the instructions (of the application-specific instruction set) are to be implemented.

The system 100 further includes a Complex Instruction Fetch and Decode (CISFD) unit 12 communicably coupled to the first memory module 10. The CISFD unit 12 fetches from the first memory unit 10, an instruction to be applied to a reinforcement learning agent or a reinforcement learning environment. Subsequently, the CISFD retrieves the 'opcode' corresponding to the instruction, from the first memory module 10. As explained earlier, the instruction fetched by the CISFD unit 12 incorporate at least one of a reinforcement learning agent ID and a reinforcement learning environment ID as the operand. Depending upon the value of the operand, the CISFD unit 12 determines the reinforcement learning agent/reinforcement learning environment on which the fetch instruction is to be implemented.

Subsequently, the CISFD unit 12, based on the 'opcode' and 'operand' corresponding to the fetched instruction, generates a plurality of predetermined threads, namely, a v-thread, a-thread, q-thread and an r-thread, corresponding to the instruction. The predetermined threads are representative of the characteristics of either the reinforcement learning agent or the reinforcement learning environment, denoted by reinforcement learning agent ID or reinforcement learning environment ID. The characteristics represented by the predetermined threads include at least the actions performed by the reinforcement learning agent, the various states of the reinforcement learning agents, the rewards gained by the reinforcement learning agent, and the like. In order to associate each of the threads with the corresponding reinforcement learning agent/reinforcement learning environment, the operand of the instruction (for which the said threads are created) is embedded into each of the v-thread, a-thread, q-thread and r-thread created in respect of the corresponding instruction.

In accordance with the embodiments herein, the 'v-thread', upon execution determines the 'state-value functions' corresponding to each state of the reinforcement learning agent. The 'state-value functions' indicate the 'value' associated with each of the states of the reinforcement learning agent. Similarly, the 'a-thread', upon execution determines the 'actions' performed by the reinforcement learning agent in every state thereof, and subsequently generates 'control signals', for implementing the 'actions' associated with the reinforcement learning agent. Similarly, the 'q-thread', upon execution determines 'Q-values' which are generated using a state-action function representing the actions performed by the reinforcement learning agent at every corresponding state. Similarly, the 'r-thread', on execution determines the rewards obtained by the reinforcement learning agent for performing a specific action while being in a specific state.

In accordance with the embodiments herein, the system 100 further includes a second processor 14 specifically configured for executing the instructions embodied in the application-specific instruction set (ASI), and for implementing the reinforcement tasks represented by the said instructions. The second processor executes the instruction fetched by the CISFD unit 12, by the way of executing the corresponding v-thread, a-thread, q-thread and r-thread. The second processor 14 (referred to as 'reinforcement learning processor' hereafter) is preferably a multi-core processor comprising a plurality of processor cores.

In accordance with the embodiments herein, each of the processor cores of the reinforcement learning processor 14 incorporate at least 'four' execution units. The threads, i.e., v-thread, a-thread, q-thread and r-thread are assigned to respective execution units of a processor core, thereby causing the threads (v-thread, a-thread, q-thread and r-thread) to be executed in parallel (simultaneously). The reinforcement learning processor 14, based on the operand associated with the fetched instruction, determines the reinforcement learning agent or the reinforcement learning environment upon which the threads (i.e., v-thread, a-thread, q-thread and r-thread) are to be executed. Subsequently, the reinforcement learning processor 14 executes the v-thread, a-thread, q-thread and r-thread on a reinforcement learning agent identified by corresponding reinforcement learning agent ID, and determines the 'state-value functions', 'actions', 'Q-values', and 'rewards' corresponding to the reinforcement learning agent identified by the reinforcement learning agent ID.

The 'state-value functions', 'actions', 'Q-values' and 'rewards' thus determined by the reinforcement learning processor 14 are stored in a second memory module 16. In accordance with the embodiments herein, the second memory module 16 is preferably bifurcated into at least 'four' memory partitions, namely, an 'a-memory module' 16A, a 'v-memory module' 16B, a 'q-memory module' 16C, and an 'r-memory module' 16D. The 'a-memory module' 16A stores the information corresponding to the actions performed by the reinforcement learning agent (identified by the reinforcement learning agent ID). The actions are stored on the 'a-memory module' 16A in a binary encoded format. The 'v-memory module' 16B stores the 'state-value functions' indicative of the value associated with every state of the reinforcement learning agent, under a predetermined policy. The 'v-memory module' 16B also stores the 'optimal state-value functions' indicative of an optimal value associated with every state of the reinforcement learning agent under an optimal policy. Further, the 'q-memory module' 16C stores 'Q-values' which are generated using a state-action function which represents a correlation between the actions performed by the reinforcement learning agent at every state and under a predetermined policy. The 'q-memory module' 16C also stores the 'optimal Q-values' for every state-action pair associated with the reinforcement learning agent, and adhering to an optimal policy. The term 'state-action function' denotes the action performed by the reinforcement learning agent at a specific state. Further, the 'r-memory module' 16D stores the 'rewards' (reward values) obtained by the reinforcement learning agent, in return for performing a specific action while being in a specific state.

Subsequently, the reinforcement learning processor 14 selectively retrieves the 'state-value functions', 'actions', 'Q-values' and 'rewards' from the 'a-memory module' 16A, 'v-memory module' 16B, 'q-memory module' 16C, and 'r-memory module' 16D respectively, and transmits the retrieved 'state-value functions', 'actions', 'Q-values' and 'rewards' to a neural network (not shown in figures) via a corresponding neural network data path 18. Subsequently, the reinforcement learning processor 14 trains the neural network to approximate reward functions that in turn associate a probable reward with the current state of the reinforcement learning agent, and also with the probable future states and future actions of the reinforcement learning agent.

In accordance with the embodiments herein, the CISFD unit 12 is configured to receive the SIMA type instructions fetched from the first memory module 10 and identify the 'opcode' corresponding to the received instruction. Subsequently, the CISFD unit 12 determines and analyzes the 'operand' (either the reinforcement learning agent ID or the reinforcement learning environment ID) and identifies the corresponding reinforcement learning agent or the reinforcement learning environment upon which the instruction is to be executed. Subsequently, the CISFD unit 12 converts the instruction into 'a-thread', 'v-thread', 'q-thread' and 'r-thread' (collectively referred to as a 'thread block'). The CISFD unit 12 also embeds the corresponding reinforcement learning agent ID or the reinforcement learning environment ID, so as to associate the instruction (received from the first memory module 10) with the corresponding thread block and the corresponding reinforcement learning agent/reinforcement learning environment. Subsequently, each of the threads, i.e., the 'a-thread', 'v-thread', 'q-thread' and 'r-thread' are assigned to respective execution units of a processor core of the reinforcement learning processor 14. In this case, each of the threads are simultaneously executed by 'four' execution units of the processor core.

In accordance with an exemplary embodiment of the embodiments herein, if the CISFD unit 12 fetches the instruction 'optval agent ID', then the CISFD unit 12 decodes the instruction to determine the 'opcode' corresponding to the instruction, and subsequently determines the function to be performed in response to the said instruction, based on the 'opcode'. Subsequently, the CISFD unit 12 triggers the creation of the 'a-thread', 'v-thread', 'q-thread' and 'r-thread' corresponding to the instruction 'optval', and triggers the reinforcement learning processor 14 to execute the 'a-thread', 'v-thread', 'q-thread' and 'r-thread' as Arithmetic Logic Unit (ALU) operations. The CISFD unit 12 instructs the reinforcement learning processor 14 to execute the 'a-thread', 'v-thread', 'q-thread' and 'r-thread' on the reinforcement learning agent/reinforcement learning environment identified by the 'operand' (reinforcement learning agent ID/reinforcement learning environment ID). The resultant of the execution of the threads are stored in 'a-memory module' 16A, 'v-memory module' 16B, 'q-memory module' 16C, and 'r-memory module' 16D respectively.

In accordance with the embodiments herein, during the execution of the 'a-thread', 'v-thread', 'q-thread' and 'r-thread' by the reinforcement learning processor 14, if the instruction corresponding to the aforementioned threads includes a reinforcement learning agent ID as an operand, then in such a case, the reinforcement learning processor 14 accesses the 'agent context' (described in FIG. 2A) corresponding to the reinforcement learning agent identified by the reinforcement learning agent ID. Subsequently, the reinforcement learning processor 14, by the way of executing predetermined ALU operations (on the context register storing the 'agent context') determines the states associated with the reinforcement learning agent, actions to be performed by the reinforcement learning agent, rewards accrued by the reinforcement learning agent, and the policy to be followed by the reinforcement learning agent. By using the information corresponding to the 'states', 'actions', 'rewards' and 'policy' associated with the reinforcement learning agent, the reinforcement learning processor 14 determines 'state-value functions', 'actions', 'Q-values' and 'rewards' corresponding to the reinforcement learning agent. Subsequently, the 'state-value functions', 'actions', 'Q-values' and 'rewards' are transmitted by the reinforcement learning processor 14 to the second memory module 16 for storage.

In accordance with the embodiments herein, the CISFD unit 12 could be conceptualized either as a fixed hardware implementation or as a programmable thread generator. In the event that the CISFD unit 12 is conceptualized as a fixed hardware implementation, then each of the instructions is decoded and subsequently executed by dedicated hardware. Alternatively, if the CISFD unit 12 is conceptualized as a programmable thread generator, then each instruction is mapped to output threads ('a-thread', 'v-thread', 'q-thread' and 'r-thread'). The output threads are preferably sequence of 'Read Modify Write (RMW)' operations performed on respective memory modules ('a-memory module' 16A, 'v-memory module' 16B, 'q-memory module' 16C, and 'r-memory module' 16D), with the 'Modify (M)' operation being performed as an ALU operation.

Figure 1A:
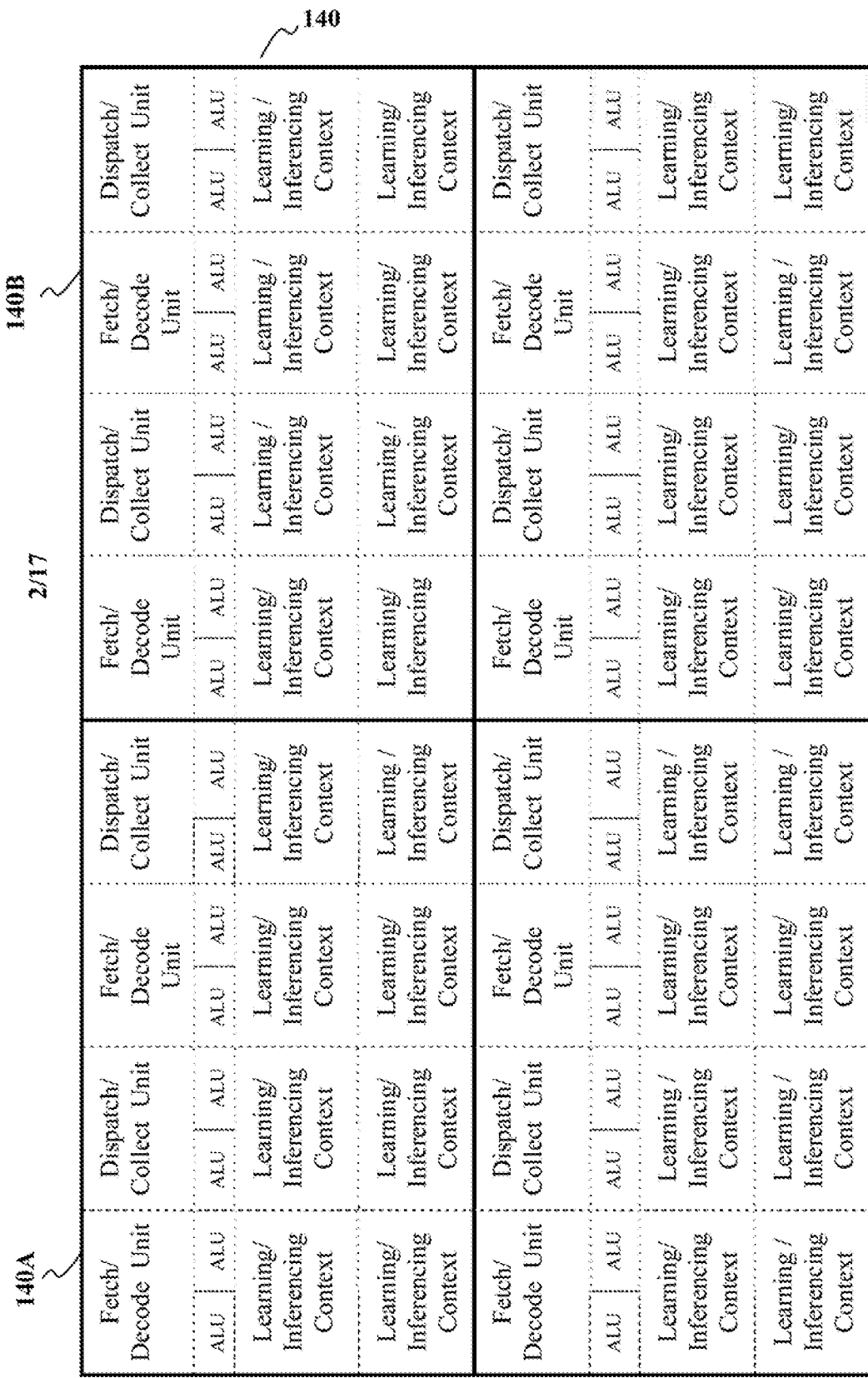
FIG. 1A is a block diagram illustrating a processor core of the reinforcement learning processor, in accordance with the embodiments herein.

In accordance with the embodiments herein, each of the processor cores (shown in FIG. 1A) of the reinforcement learning processor 14 incorporate predetermined number of execution units (shown in FIG. 1B). Each of the execution units execute the threads corresponding to the SIMA instruction fetched from the first memory module 10. As shown in FIG. 1B, an execution unit 140 incorporates a fetch unit 14A and a dispatch unit 14B. The fetch unit 14A is configured to fetch the ALU instructions from the CISFD unit 12 for execution. The dispatch unit 14B accesses the 'a-memory module' 16A, 'v-memory module' 16B, 'q-memory module' 16C, and 'r-memory module' 16D to complete the execution of the threads ('a-thread', 'v-thread', 'q-thread' and 'r-thread'). Further, the execution unit 140 also stores the 'learning context' and the 'inferencing context' corresponding to the reinforcement learning agent/reinforcement learning environment represented by the operand of the SIMA instruction. The 'learning context' and the 'inferencing context' are stored across a plurality of status registers, constant registers and configuration registers (not shown in figures).

The term 'learning context' represents the characteristics associated with a reinforcement learning environment with which the reinforcement learning agent interacts, and learns from. Further, the term 'leaning context' also represents a series of observations and actions which the reinforcement learning agent has obtained as a result of the interaction with the reinforcement learning environment. The term 'inferencing context' represents the manner in which the reinforcement learning agent behaves (i.e., performs actions) subsequent to learning from the interaction with the reinforcement learning environment.

In accordance with the embodiments herein, execution of each of the SIMA instructions is denoted using a coreID. The coreID is determined based on the processor core executing the SIMA instruction. Further, each of the learning contexts stored in the corresponding execution unit of the processor core (executing the SIMA instruction) are identified using a contextID. Further, each of the threads (i.e., 'a-thread', 'v-thread', 'q-thread' and 'r-thread') corresponding to the said SIMA instruction are identified by a combination of a threadID and the coreID and the contextID. The combination of threadID, coreID and the contextID is illustrated in FIG. 1C.

In accordance with the embodiments herein, 'learning context' is associated with the 'exploration' activities performed by a particular reinforcement learning agent within a corresponding reinforcement learning environment. The term 'exploration' characterizes the activities in which the reinforcement learning agent interacts with the reinforcement learning environment by the way of performing predetermined actions, and learns from the interactions with the reinforcement learning environment. Further, 'inferencing context' is associated with the 'exploitation' activities performed by the reinforcement learning agent within the corresponding reinforcement learning environment. The term 'exploitation' characterizes the activities in which the reinforcement learning agent decides upon the actions to be performed, based on the learnings gathered from the previous interactions with the reinforcement learning environment. Any of the well known algorithms such as epsilon-greedy algorithm, Boltzmann sweep algorithm, epsilon-soft policy, softmax action selection policy are utilized for the purpose of 'exploitation', depending upon the suitability of the algorithm to the reinforcement learning environment.

Referring to the block diagram shown in FIG. 1D, the term 'agentID' denotes the reinforcement learning agent performing either exploitation of exploration activity. The term 'envID' denotes the reinforcement learning environment within which the reinforcement learning agent is performing either the exploration or exploitation activity. A particular reinforcement learning environment (denoted by 'envID') could interact with multiple reinforcement learning agents (denoted by respective agentIDs). Therefore, agentID represents the specific reinforcement learning agent interacting with the reinforcement learning environment. Further, coreID represents the processor core (of the reinforcement learning processor 14) executing the SIMA instruction applied upon either the reinforcement learning agent identified by 'agentID' or the reinforcement learning environment represented by 'envID'. Further, contextID represents the context (exploitation or exploration) of the activity performed by the reinforcement learning agent (represented by 'agentID') by the way of interaction with the reinforcement learning environment (represented by 'envID'), as a part of the execution of the SIMA instruction. Every processor core (represented by coreID) is configured to simultaneously implement multiple contexts (represented by respective contextIDs). Further, 'threadID' represents the threads (i.e., 'a-thread', 'v-thread', 'q-thread' and 'r-thread') corresponding to the SIMA instruction applied onto either the reinforcement learning agent identified by 'agentID' or the reinforcement learning environment represented by 'envID'.

Referring again to FIG. 1, the system 100 further includes a scalable scheduler module 20 that provides the second processor 14 with selective access to the neural network data paths 18. The scheduler module 20 also controls the operations of a Digital Signal Processing (DSP) unit 26, a Memory Management Unit (MMU) 28, and the software driver modules ('Hostif' drivers) 30 that facilitate the communication between the reinforcement learning processor 14 and a first processor 24 (referred to as 'host processor' hereafter). Further, the scheduler module 20 allocates memory space in each of the aforementioned memory modules for the results of the execution of the 'a-thread', 'v-thread', 'q-thread' and 'r-thread' to be written thereto. The scheduler module 20 controls the access to the 'a-memory module' 16A, 'v-memory module' 16B, 'q-memory module' 16C, and 'r-memory module' 16D. Additionally, the scheduler module 20 is also configured to selectively prioritize the activities (exploration and exploitation) of predetermined reinforcement learning agents. Further, the scheduler module 20 also prioritizes the activities (exploration and exploitation) performed upon predetermined reinforcement learning environments. Additionally, the scheduler module 20 selectively prioritizes the interaction between the reinforcement learning processor 14 and the host processor 24.

Referring to FIG. 1 again, the 'a-memory module' 16A stores information corresponding to the actions performed by the reinforcement learning agent. The 'v-memory module' 16B stores the 'state-value functions' indicative of the value associated with every state of the reinforcement learning agent, under a predetermined policy. The 'v-memory module' 16B also stores the 'optimal state-value functions' indicative of an optimal value associated with every state of the reinforcement learning agent under an optimal policy. Further, the 'q-memory module' 16C stores 'Q-values' which are generated using a state-action function which represents a correlation between the actions performed by the reinforcement learning agent at every state and under a predetermined policy. The 'q-memory module' also stores the 'optimal Q-values' for every state-action pair associated with the reinforcement learning agent, and adhering to an optimal policy. The term 'state-action pair' denotes the action performed by the reinforcement learning agent at a specific state. Further, the 'r-memory module' 16D stores the 'rewards' (reward values) obtained by the reinforcement learning agent, in return for performing a specific action while being in a specific state.

Figure 1E:
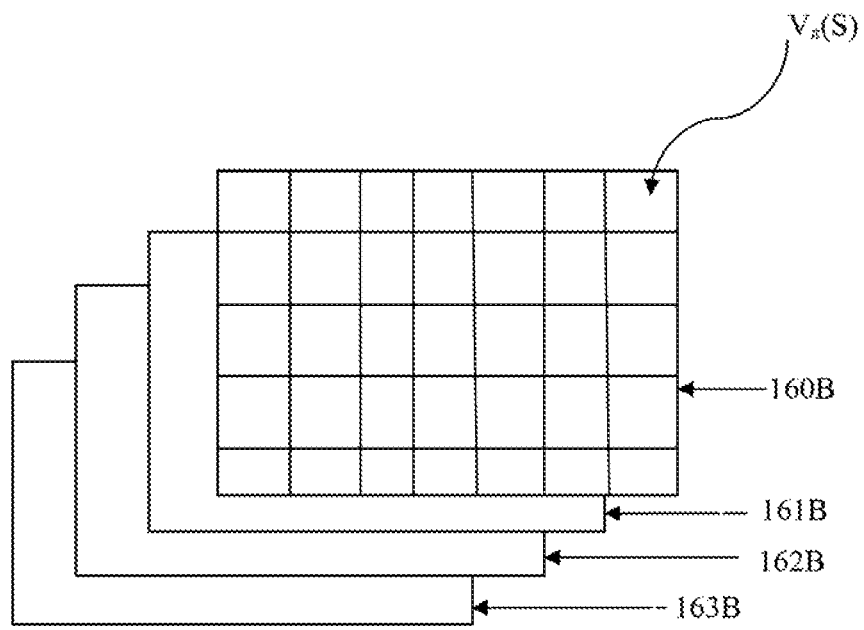
FIG. 1E is a block diagram illustrating the memory banks corresponding to the v-memory module, in accordance with the embodiments herein.

In accordance with the embodiments herein, the 'v-memory module' 16B is bifurcated into a plurality of memory banks as shown in FIG. 1E, with each memory bank of the 'v-memory module' 16B storing 'state-value function $V\pi(S)$' indicative of the value of a specific state of the reinforcement learning agent under a predetermined policy. As shown in FIG. 1D, the 'v-memory module' 16B is bifurcated into 'four' exemplary memory banks 160B, 161B, 162B and 163B. For example, memory bank 160B stores the 'state-value function' indicative of a 'first' value corresponding to a 'first' state of the reinforcement learning agent under a predetermined policy. Further, memory bank 161B stores the 'state-value function' indicative of a 'second' value corresponding to a 'second' state of the reinforcement learning agent under the predetermined policy. Further, memory bank 162B stores the 'state-value function' indicative of a 'third' value corresponding to a 'third' state of the reinforcement learning agent under the predetermined policy. Further, memory bank 163B stores the 'state-value function' indicative of a 'fourth' value corresponding to a 'forth' state of the reinforcement learning agent under the predetermined policy.

Figure 1F:
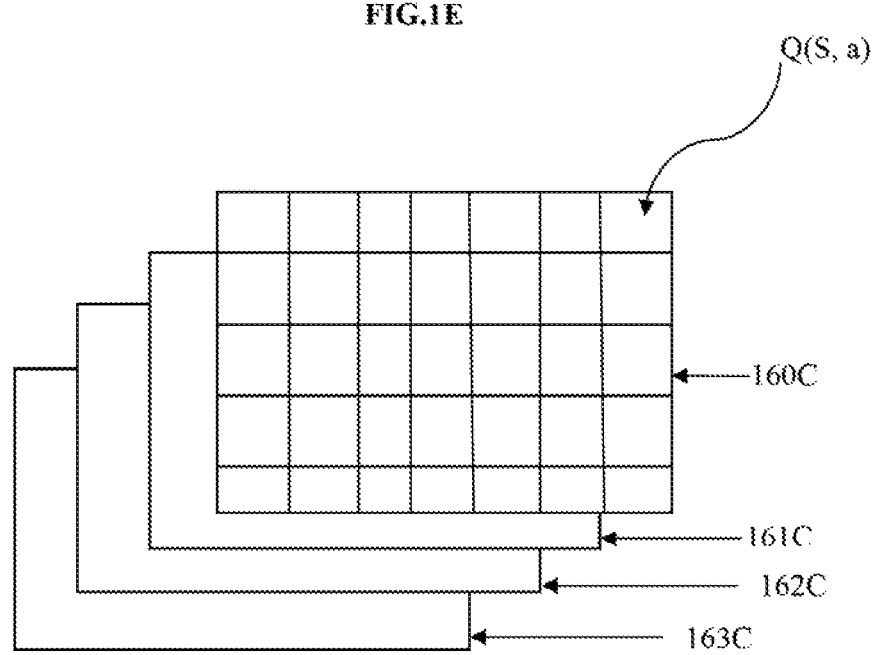
FIG. 1F is a block diagram illustrating the memory banks corresponding to the q-memory module, in accordance with the embodiments herein.

In accordance with the embodiments herein, the 'q-memory module' 16C is bifurcated into a plurality of memory banks as shown in FIG. 1F. As shown in FIG. 1F, the 'q-memory module' 16A is bifurcated into 'four' exemplary memory banks 160C, 161C, 162C and 163C. Each memory bank of the 'q-memory module' 16C stores the 'Q-value' corresponding to an action performed by the reinforcement learning agent, at a particular state and under the predetermined policy. For example, memory bank 160C stores the 'Q-value' corresponding to a 'first' action performed by the reinforcement agent while being at a 'first' state and following a predetermined policy. Further, memory bank 161C stores the 'Q-value' corresponding to a 'second' action performed by the reinforcement agent while being at a 'second' state and following the predetermined policy. Further, memory bank 162C stores the 'Q-value' corresponding to a 'third' action performed by the reinforcement agent while being at a 'third' state and following the predetermined policy. Further, memory bank 163C stores the 'Q-value' corresponding to a 'forth' action performed by the reinforcement agent while being at a 'forth' state and following the predetermined policy.

Figure 1G:
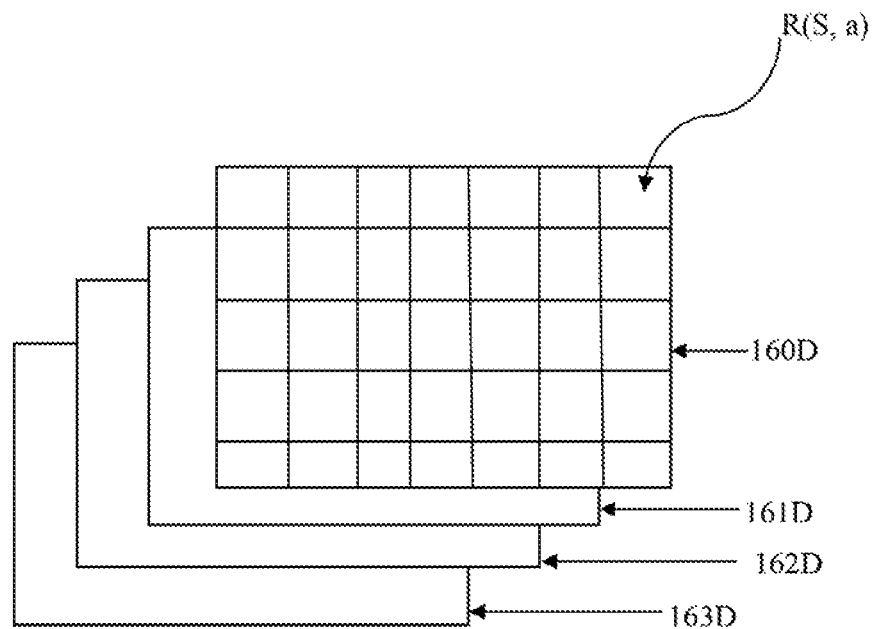
FIG. 1G is a block diagram illustrating the memory banks corresponding to the r-memory module, in accordance with the embodiments herein.

Similarly, the 'r-memory module' 16D is bifurcated into a plurality of memory banks as shown in FIG. 1G, with each memory bank of the 'r-memory module' 16D storing a 'reward value' indicative of the reward obtained by the reinforcement learning agent, in return for performing a specific action (while being) in a specific state, and under the predetermined policy. As shown in FIG. 1G, the 'r-memory module' 16D is bifurcated into 'four' exemplary memory banks 160D, 161D, 162D and 163D. The memory bank 160D stores a reward value indicative of the reward obtained by the reinforcement learning agent, in return for performing a 'first' action (while being) in a 'first' state, under a predetermined policy. Further, memory bank 161D stores a reward value indicative of the reward obtained by the reinforcement learning agent, in return for performing a 'second' action in a 'second' state under the predetermined policy. Further, memory bank 162D stores a reward value indicative of the reward obtained by the reinforcement learning agent, in return for performing a 'third' action in a 'third' state under the predetermined policy. Further, memory bank 163D stores a reward value indicative of the reward obtained by the reinforcement learning agent, in return for performing a 'forth' action in a 'forth' state under the predetermined policy.

In accordance with the embodiments herein, the 'v-memory module' 16B, the 'q-memory module' 16C and the 'r-memory module' 16D are accessed by the CISFD unit 12 and the reinforcement learning processor 14 by using a combinational sequence of 'envID', 'agentID', 'stateID', and 'actionID'. As explained in the aforementioned paragraphs, the term 'envID' denotes the reinforcement learning environment within which the reinforcement learning agent is performing either the exploration or exploitation activity, and the term 'agentID' denotes the reinforcement learning agent performing either the exploration or exploitation activity. Further, 'stateID' denotes the current state of the reinforcement learning agent, and the term 'actionID' denotes the action undertaken (performed) by the reinforcement learning agent while being in a specific state which is denoted by 'stateID'.

In the case of 'v-memory module' 16B, which is bifurcated into memory banks 160B, 161B, 162B and 163B, memory bank 160B stores the 'state-value function' indicative of a 'first' value corresponding to a 'first' state (represented by stateID) of the reinforcement learning agent (represented by agentID) under the predetermined policy. The 'envID' representing the reinforcement learning environment remains unchanged for the 'four' exemplary memory banks 160B, 161B, 162B and 163B since the reinforcement learning agent (represented by agentID) interacts with only one reinforcement learning environment at a given point of time. Similarly, the memory bank 161B stores the 'state-value function' indicative of a 'second' value corresponding to a 'second' state (represented by stateID) of a reinforcement learning agent (represented by agentID) under the predetermined policy. Similarly, the memory bank 162B stores the 'state-value function' indicative of a 'third' value corresponding to a 'third' state (represented by stateID) of a reinforcement learning agent (represented by agentID) under the predetermined policy. Similarly, the memory bank 163B stores the 'state-value function' indicative of a 'forth' value corresponding to a 'forth' state (represented by stateID) of a reinforcement learning agent (represented by agentID) under the predetermined policy.

In the case of 'q-memory module' 16C, which is bifurcated into memory banks 160C, 161C, 162C and 163C, memory bank 160C stores the 'Q-value' corresponding to a 'first' action (represented by actionID) performed by the reinforcement agent (represented by agentID) while being at a 'first' state (represented by stateID) and following the predetermined policy. Similarly, memory bank 161C stores the 'Q-value' corresponding to a 'second' action (represented by actionID) performed by the reinforcement agent (represented by the agentID) while being at a 'second' state (represented by stateID) and following the predetermined policy. Similarly, memory bank 162C stores the 'Q-value' corresponding to a 'third' action (represented by actionID) performed by the reinforcement agent (represented by the agentID) while being at a 'third' state (represented by stateID) and following the predetermined policy. Similarly, memory bank 163C stores the 'Q-value' corresponding to a 'forth' action (represented by actionID) performed by the reinforcement agent (represented by the agentID) while being at a 'forth' state (represented by stateID) and following the predetermined policy.

In the case of 'r-memory module' 16D, which is bifurcated into memory banks 160D, 161D, 162D and 163D, the memory bank 160D stores a reward value indicative of the reward obtained by the reinforcement learning agent (represented by agentID), in return for performing a 'first' action (represented by actionID) in a 'first' state (represented by stateID), under the predetermined policy. The 'envID' representing the reinforcement learning environment remains unchanged for the 'four' exemplary memory banks 160D, 161D, 162D and 163D since the reinforcement learning agent (represented by agentID) interacts with only one reinforcement learning environment at a given point of time. Similarly, memory bank 161D stores a reward value indicative of the reward obtained by the reinforcement learning agent (represented by agentID), in return for performing a 'second' action (represented by actionID) in a 'second' state (represented by stateID), under the predetermined policy. Similarly, memory bank 162D stores a reward value indicative of the reward obtained by the reinforcement learning agent (represented by agentID), in return for performing a 'third' action (represented by actionID) in a 'third' state (represented by stateID), under the predetermined policy. Similarly, memory bank 163D stores a reward value indicative of the reward obtained by the reinforcement learning agent (represented by agentID), in return for performing a 'forth' action (represented by actionID) in a 'forth' state (represented by stateID), under the predetermined policy.

In accordance with the embodiments herein, for the interaction between the reinforcement learning agent and the reinforcement learning environment, the 'Q-values' are segregated based on the corresponding action and corresponding state, and subsequently stored in the memory banks 160C, 161C, 162C and 163C. Similarly, the 'state-value functions' are segregated based on the value of the reinforcement learning agent at every specific state, and stored on the memory banks 160B, 161B, 162B and 163B. Similarly, the rewards are segregated based on the action, and the state and the corresponding action, and stored in the memory banks 160D, 161D, 162D and 163D.

In order to obtain an optimal Q-value, the 'Q-values' stored on the memory banks 160C, 161C, 162C and 163C are extracted serially (i.e., beginning with the first bank 160C and moving to the last bank 163C), and the highest of the 'Q-values' extracted from the memory banks 160C, 161C, 162C and 163C is determined and considered as the optimal Q-value. The state-action pair corresponding to the highest of the Q-values is identified. The optimal Q-value, and the corresponding state-action pair are utilized as a benchmark for iteratively approximating the actions, rewards and an optimal policy for any new states of the reinforcement learning agent.

Similarly, state-value functions stored on the memory banks 160B, 161B, 162B and 163B are retrieved serially (i.e., beginning with the first bank 160B and moving to the last bank 163B), and the highest value of the reinforcement learning agent across the various states (in this case, the first state, second state, third state and forth state) is identified, and is considered as the optimal state-value function. The optimal state-value function could be utilized to estimate an optimal policy that is considered to be better than any other policies available for the reinforcement learning agent.

Similarly, rewards stored on the memory banks 160D, 161D, 162D and 163D are retrieved serially (i.e., beginning with the first bank 160D and moving to the last bank 163D), and the highest of the retrieved rewards is determined, and the corresponding state-action pair is identified. The highest of the retrieved rewards is used as a benchmark for approximating a reward function, and for determining the manner in which the reward obtained by the reinforcement learning agent during the course of interaction with the reinforcement learning environment could be maximized.

In accordance with the embodiments herein, the system 100 further includes a first processor 24 (referred to as 'host processor' hereafter) configured to create at least one reinforcement learning agent and a corresponding reinforcement learning environment, thereby initiating a computational approach for implementing reinforcement learning operations. The first processor 24 creates at least one reinforcement learning agent and a corresponding reinforcement learning environment by the way of programming predetermined, common memory mapped configuration registers. The reinforcement learning agent is represented a 1-bit wide 'agent register', while the reinforcement learning environment is represented by a 1-bit wide 'environment register'. The reinforcement learning agent is represented by 'agentID', and the reinforcement learning agent is mapped to the reinforcement learning environment by 32-bit 'envID'. In accordance with an exemplary embodiment of the embodiments herein, when the host processor writes the value '1' or any other predetermined signature on to the predetermined configuration registers, the reinforcement learning agent and the reinforcement learning environment are created. Further, the host processor 24 preferably loads the application-specific instruction set comprising the instructions for implementing predetermined reinforcement learning operations, onto the first memory module 10. Subsequently, the host processor 24 triggers the reinforcement learning processor 14 to execute the instructions corresponding to the reinforcement learning operations.

Figure 2A:
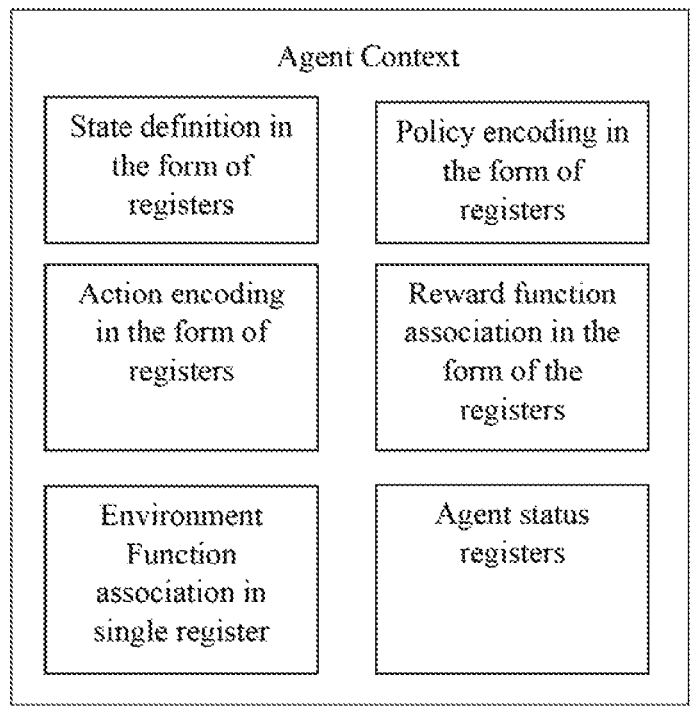
FIG. 2A is a block diagram illustrating the agent context corresponding to the reinforcement learning agent, in accordance with the embodiments herein.
Figure 2B:
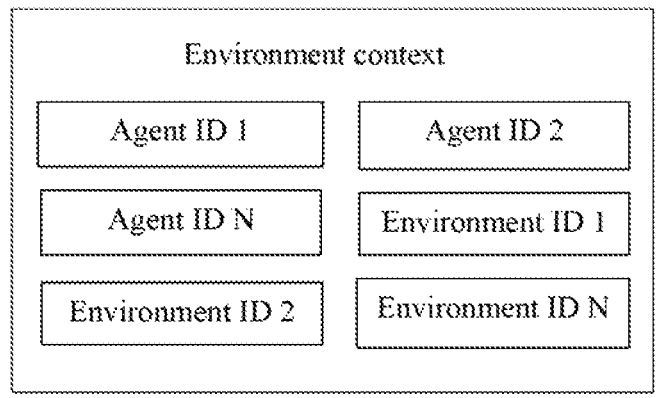
FIG. 2B is a block diagram illustrating the environment context corresponding to the reinforcement learning environment, in accordance with the embodiments herein.

In accordance with the embodiments herein, each of the reinforcement learning agents are associated with an 'agent context', and each of the reinforcement learning environments are associated with an 'environment context'. The 'agent context' as shown in FIG. 2A is a collection of configuration registers and host registers, which store information pertaining to the status of the reinforcement learning agent, actions to be performed by the reinforcement learning agent, reward function associated with the agent, policy to be followed by the reinforcement learning agent, and the like. The 'environment context' as shown in FIG. 2B is also a collection of configuration registers and host registers, which store the information including 'agentID' corresponding to each of the reinforcement learning agents interacting with the reinforcement learning environment, and 'experimentID' corresponding to the reinforcement learning experiments performed by each of the reinforcement learning agents.

Figure 3:
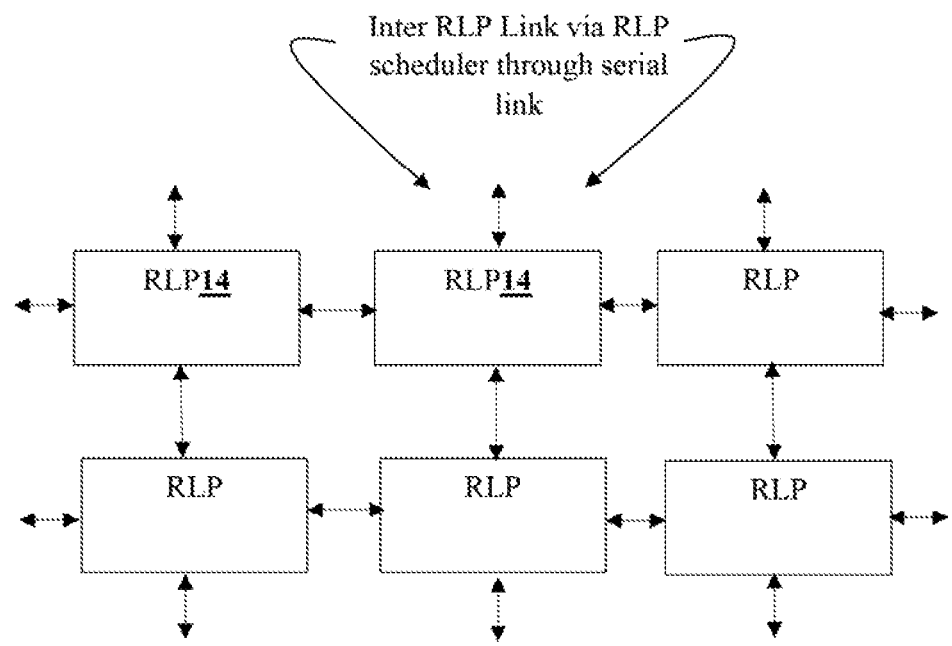
FIG. 3 is a block diagram illustrating the multi-processor configuration of the reinforcement learning processor, in accordance with the embodiments herein.

Referring to FIG. 3, there is shown a multi-processor configuration involving the reinforcement learning processor 14, in accordance with an exemplary embodiment of the embodiments herein. The multi-processor configuration of the reinforcement learning processor 14 (all the RL processors are collectively represented by reference numeral 14) is conceptualized using an inter-core connection of the reinforcement learning processor 14. The reinforcement learning processor 14 incorporates '4' ports to form a communication link (connection) with '4' reinforcement learning processors as exemplified in FIG. 3. The reinforcement learning processor 14 incorporates a scalable architecture which provides for the number of processing cores to be scaled in line with the complexity of reinforcement learning operations/tasks. The scheduler module 20 (not shown in FIG. 3) of the reinforcement learning processor 14 is configured to be implemented on a multi-chip mode and provide the reinforcement learning processor 14 with required internal memory access and external memory access. Further, the scheduler module 20 also provides for intercommunication between the reinforcement learning processors assembled using the multi-processor configuration. Since the first memory module 10 and the second memory module 16 are not hierarchical, and configured to be accessed based on the synchronization between the processing cores of the reinforcement learning processor 14, the first memory module 10 and the second memory module 16 provide for a consistent implementation of reinforcement learning tasks, even on the multi-chip mode. The reinforcement learning processor 14 when implemented using a multi-processor configuration provides for comparatively higher levels of parallelism between a plurality of reinforcement learning agents and a plurality of reinforcement learning environments.

Figure 4:
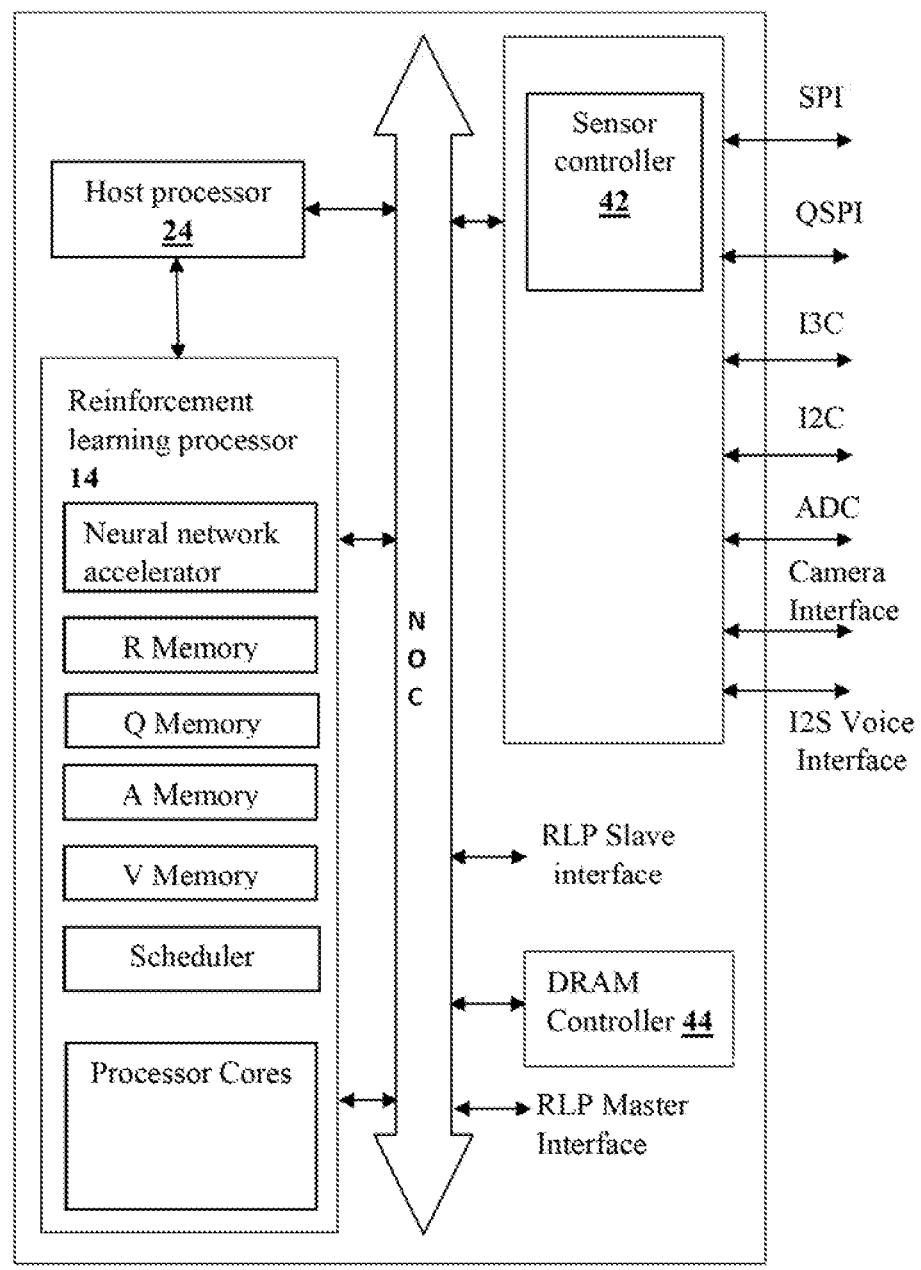
FIG. 4 is a block diagram illustrating the configuration of a System on Chip (SoC) incorporating the reinforcement learning processor, in accordance with the embodiments herein.

Referring to FIG. 4, there is shown a schematic representation of the system 100 as a System on Chip (SOC). The SOC architecture as shown in FIG. 4 includes a host processor 24, reinforcement learning processor 14, sensor controllers 42, DRAM controller, and first memory module 10 communicably coupled through a Network on Chip (NOC) architecture. The host processor 24 executes a predetermined host application which communicates with the reinforcement learning processor 14 through a mailbox interrupt. The reinforcement learning processor 14 is preferably programmed via a host memory map of the host processor 24. Further, the reinforcement learning processor 14 includes a slave/configuration interface and a master interface. The reinforcement learning processor 14 receives sensory inputs from the sensor controllers. The reinforcement learning processor 14 converts the sensory inputs into rewards via at least one of reward function approximation, supervisory training and exploitation and exploitation of reinforcement learning environment. The reinforcement learning processor 14 samples rewards via at least one of on-chip Input/output (I/O), sensor I/Os (for example I2C, I3C, I2S), and sensor specific ADC (analog to digital converter).

In accordance with the embodiments herein, the reinforcement learning processor 14 communicates with the host processor 24 communicate through Mailbox interrupts. A Time series database (TSD) stores the time series of mailbox interrupts generated by the host processor 24 and the reinforcement learning processor 14. TSD typically includes arrays of numbers indexed by time. Typically, a mailbox interrupt generated by the host processor 24 (host interrupt) is mapped to a mailbox interrupt generated by the reinforcement learning processor 14. Further, all the mailbox interrupts generated by the reinforcement learning processor 14 are mapped to the mailbox interrupts generated by the host processor 24. Interrupts are either vectored interrupts or nested interrupts. The interrupt messages are generated from a dedicated mailbox implemented via an on-chip SRAM (static RAM).

The host processor 24 configures the reinforcement learning processor 14 to create reinforcement learning environments and reinforcement learning agents. The host processor 24 is configured to access the memory mapped registers of the reinforcement learning processor 14. The host processor 24 is configured to program the first memory module 10 with the application-specific instruction set (ASI) comprising instructions for implementing predetermined reinforcement learning operations. The host processor 24 further programs the memory mapped registers to configure neural networks, recurrent networks and the like. The host processor 24 reads the status of each of the memory mapped registers and the execution contexts stored therein. The reinforcement learning processor 14 is powered, collapsed, clock gated and executed at suitable clock frequencies by the host processor 24.

Figure 5:
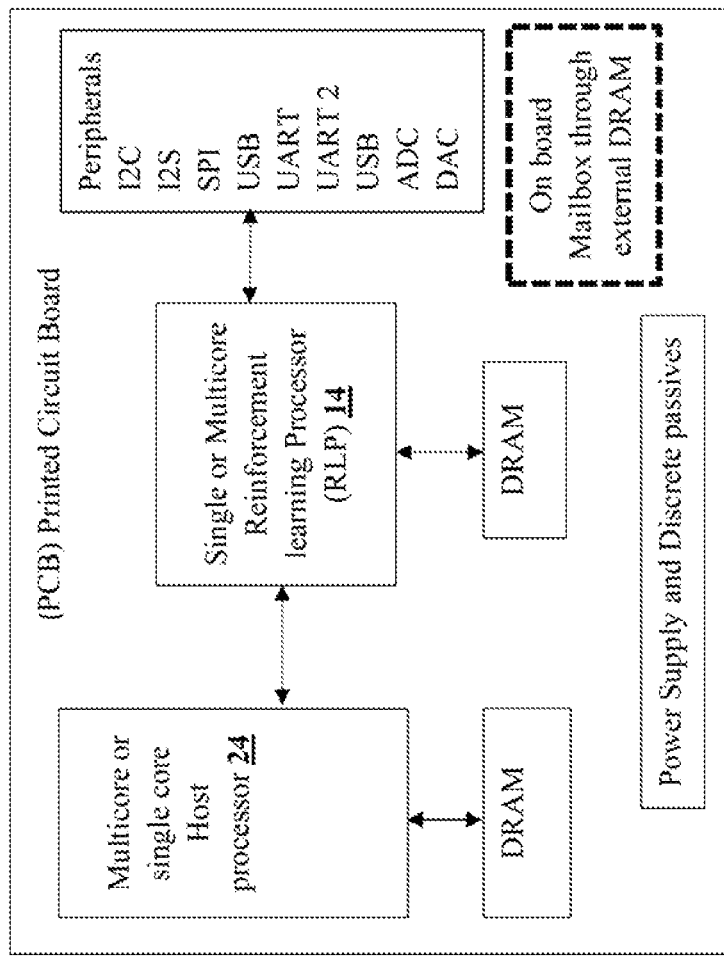
FIG. 5 is a block diagram illustrating the configuration of a Printed Circuit Board (PCB) incorporating the reinforcement learning processor, in accordance with the embodiments herein.

Referring to FIG. 5, there is shown a schematic representation of the reinforcement learning processor 14 integrated on a Printed Circuit Board (PCB), in accordance with an exemplary embodiment of the embodiments herein. The host processor 24 and the reinforcement learning processor 14 are integrated onto on the printed circuit board (a single Die). The host processor 24 and the reinforcement learning processor 14 interact via a chip to chip connectivity (52). The chip to chip connectivity is mapped to one of a high-speed SERDES serial interface or to GPIOs (General Purpose I/Os). The GPIOs are also mapped to host interrupts (generated byte host processor 24) and RLP interrupts (generated by the reinforcement learning processor).

Referring to FIG. 6, there is shown a flowchart illustrating the steps involved in the computer-implemented method for implementing predetermined reinforcement learning operations. At step 600, a first processor (referred to as host processor hereafter) creates at least one reinforcement learning agent and at least one corresponding reinforcement learning environment. Subsequently, the host processor assigns a reinforcement learning agent ID to the reinforcement learning agent, and a reinforcement learning environment ID to the reinforcement learning environment. At step 602, an application-domain specific instruction set (ASI) comprising instructions for implementing predetermined reinforcement learning operations is created. Further, at step 604, each of the instructions are configured to incorporate at least one of the reinforcement learning agent ID and the reinforcement learning environment ID as an operand.

At step 606, the application-domain specific instruction set comprising instructions for implementing the predetermined reinforcement learning operations is stored in a first memory module. At step 608, at least one of the instructions is selectively fetched by a complex instruction fetch and decode (CISFD) unit. Subsequently, the CISFD unit decodes the instruction and generates a plurality of predetermined threads representative of the decoded instruction. Further at step 608, the plurality of predetermined threads representing the decoded instruction are embedded with at least one of the reinforcement learning agent ID and reinforcement learning environment ID corresponding to the decoded instruction.

At step 610, each of the predetermined threads is processed in parallel by a second processor having multiple processing cores (referred to as reinforcement learning processor hereafter). During the execution of the threads, the instruction corresponding to the threads is applied onto one of the reinforcement learning agent and reinforcement learning environment identified by the reinforcement learning agent ID and reinforcement learning environment ID embedded in the predetermined threads. The reinforcement learning processor is configured to implement the instructions simultaneously on a plurality of reinforcement learning agents and a plurality of reinforcement learning environments. At step 612, based on the execution of the threads, an actions (associated with the reinforcement learning agent), a state-value function, a Q-value and a reward value are determined by the reinforcement learning processor. At step 614, the determined actions, state-value function, Q-value and reward value are stored in predetermined memory partitions of a second memory module.

At step 616, a neural network is triggered via a corresponding neural network data path, and the determined actions, state-value function, Q-value and reward value are transferred to the neural network for analysis. Subsequently, the neural network is trained using the determined actions, state-value function, Q-value and reward value, to approximate a value-function and a reward function corresponding to either a current state or a future state of the reinforcement learning agent.

Shown herein below is a table incorporating a non-exhaustive, exemplary list of instructions for performing predetermined reinforcement learning operations. The instructions, as described above are embodied in an application-domain specific instruction set (ASI).

| Instruction | Opcode | Operand | Description |
| --- | --- | --- | --- |
| Abs | 0000000000000000 | GPr1 | absolute |
| Ldgpx | 0000000000000001 | Offset (32 bit) | Load [gpx] < [addr] |
| Stgpx | 0000000000000010 | Offset (32 bit) | Store [addr] < [gpx] |
| Add | 0000000000000011 | GPr1, GPr2 | Add two 32 bit intergers and store in GPr2 |
| And | 0000000000000100 | Gpr1 Gpr2 | AND of 2 32 bit integers stored in GPRr2 |
| Brkpt | 0000000000000101 | Nil | Break point |
| Mul | 0000000000000110 | GPr1, GPr2 | Multiply two fixed point numbers stored in General Purpose registers GPr2 |
| Div | 0000000000000111 | GPr1, GPr2 | Division on 32 bit floating point, store result in GPr2 |
| Mv | 0000000000001000 | regA, regB | Move content from RegA register to RegB |
| Mulf | 0000000000001001 | GPr1, GPr2 | Multiplication of 2 32 bit floating point, result is 64 bit register |
| Not | 0000000000001010 | GPr1 | Not of 32 bit integer |
| Nor | 0000000000001011 | GPr1 | Nor operation on 32 bit integer |
| Or | 0000000000001100 | GPr1 | OR operation on 32 bit integer |
| Xor | 0000000000001101 | GPr1 | XOR operation on 32 bit integer |
| Srl | 0000000000001110 | GPr1 | Shift right logical |
| Sra | 0000000000001111 | GPr1 | Shift right arithmetic |
| Rmw | 0000000000010000 | Offset (32 bit), ops (2 bit) | Read modify write |

-continued

| Instruction | Opcode | Operand | Description |
|---|---|---|---|
| Crtagenttype | 0000000000010001 | Agent type ID (8 bit), num ops (4 bit), mem pointers to ops (16 bit mem) | Creates empty env with env ID k. ops pointer are pointing to segment of program to be executed. The segment of program will be stored in memory using GP instruction |
| Crtenv | 0000000000010010 | Env ID (16 bit) | Creates empty env with env ID k |
| Crtagent | 0000000000010011 | Env ID (16 bit), agent ID (16 bit), Agent Type (12 bit) | Create an empty agent in an env with ID k and assign 32 bit ID to agent |
| Ldrwd | 0000000000010100 | reward ID (8 bit), mem_base (16 bit), len (16 bit), base_addr_ext_mem (24 bit) | Loads reward function micro code into on chip reward buffer from external RAM |
| Strwd | 0000000000010101 | reward ID (8 bit), mem_base (16 bit), len (16 bit), base_addr_ext_mem (24 bit) | stores reward function micro code into external memory |
| Ldop | 0000000000010100 | Op ID (8 bit), mem_base (16 bit), len (16 bit), base_addr_ext_mem (24 bit) | Loads operation function micro code into on chip ops buffer from external RAM |
| Strop | 0000000000010101 | Op ID (8 bit), mem_base (16 bit), len (16 bit), base_addr_ext_mem (24 bit) | stores Operation function micro code into external memory |
| Assocrewardk_env | 0000000000010110 | env ID (16 bit), reward ID (8 bit) | Associate reward function to env ID k. Most reward functions are programmable |
| Assocrewardk_agnt | 0000000000010111 | agent ID (16 bit), reward ID (8 bit) | Associate reward function to Agent ID k. Each agent can have upto 32 reward functions. Most reward functions are stored in forms of operation instructions (ops instructions) |
| Assocact_agnt | 0000000000011000 | agent ID (16 bit), reward ID (8 bit) | Associate reward function to Agent ID k. Each agent can have upto 32 reward functions. Most reward functions are programmable. |
| Assocfuncapprox_agnt | 0000000000011001 | agent ID (16 bit), func approx ID (8 bit) | Associate function approx to Agent ID k. Each agent can have upto 32 reward functions. Most reward functions are programmable. |
| Assocexplo_agnt | 0000000000011010 | agent ID (16 bit), exp type ID (8 bit) | Associate reward function to Agent ID k. Each agent can have upto 32 reward functions. Most reward functions are programmable |
| Intrctenvk | 0000000000011011 | Agent ID(16 bit), N (32 bit) | Agent k to Interact with env for N times and update Q, V, A and R mem |
| Rdagentctx | 0000000000011100 | Agent ID (16 bit) | Reads the agent context and stores it into external memory or host memory |
| Rdenvctx | 0000000000011101 | Env ID (16 bit) | Reads env context and stores it into external memory or host memory |
| Funcaprrox | 0000000000011110 | 16 bit num agents, 32 bit offset to agent vector start address (24 bit vector, combination of 16 bit agent ID and 8 bit funcapprox) | Value function approximation using 32 bit agent ID using linear method |
| Extoptk | 0000000000011111 | 16 bit num agents, 32 bit offset to agent vector start address | Exploitation only mode for Agent K |
| Optval | 0000000000001100 | 16 bit num agents, 32 bit offset to agent vector start address | Optimal value function for current state of MDP of the Agent k. |

-continued

| Instruction | Opcode | Operand | Description |
| --- | --- | --- | --- |
| Explrk | 0000000000001101 | 16 bit num agents, 32 bit offset to agent vector start address, duration vector base (24 bit vector, combination of 16 bit agent ID and 8 bit exploration type) | Enter into exploration mode agent k |
| Explrall | 0000000000001110 | Env ID (16 bit), duration (16 bit) | Enter into Exploration mode for all agent in a given env ID |
| Plank | 0000000000011000 | 16 bit num agents, 32 bit offset to agent vector start address | Plan for agent k (algorithm for planning hardcoded currently) |
| Modelenv | 0000000000101110 | 16 bit num agents, 32 bit offset to agent vector start address | Model environment for agent k |
| Modelenvall | 0000000000101111 | Env ID (16 bit) (Can we patent) | Model environment for all agents in env k, This uses |
| Upwdnnk | 0000000000110001 | Training context ID (32 bit) | Upload or backup of trained deep neural network with training context Id k |
| Optq | 0000000000110101 | Agent ID (32 bit) | Optimal q value of current state of MDP of agent k |

In accordance with the embodiments herein, Implementation of the aforementioned instructions is generic or programmable in nature and it represents equations for respective function. The hardware implementation involves using logic and registers. The Agent ID and environment ID is at least one of a scalar ID or a vector ID, where a Single instruction isexecuted with multiple Agents in an environment (SIMA). In SIMA, instructions are customized for Artificial Intelligence and Machine Learning (ML) operations. In SIMA, same instruction is applied to plurality of AI agents within same or different environments. The AI agents operate in lockstep to perform one of backup operation of MDP, exploration of the environment, exploiting the environment both exploration and exploitation of the environment according standard algorithms to balance exploration and exploitation. Further, SIMA instructions helps in avoiding curse of dimensionality in RL, by sharing the exploration spaces with many agents and sharing the learnt knowledge among parallel agents. Thus, the instructions along with reinforcement learning processor provides parallel learning for RL agents and fast exploration and effective exploitation.

The Q-values are determined based on the execution of the q-thread. Further, the actions are determined based on the execution of the a-thread. Further, the state-value functions are determined based on the execution of the v-thread. Further, the reward values are determined based on the execution of the r-thread.

In accordance with the embodiments herein, the Q-values are generated using a state-action function representative of each state of the reinforcement learning agent, and an action performed by the reinforcement learning agent in the said state. Further, the Q-values are stored on the plurality of memory banks (160B, 161B, 162B and 163B) of the q-memory module 16B. Every memory bank of the q-memory module stores a Q-value corresponding to 'one' state-action pair representative of an interaction between the reinforcement learning agent and the reinforcement learning environment. Subsequently, the Q-values are extracted from the respective memory banks, and compared for identification of the highest Q-value amongst the extracted Q-values. Further, the highest Q-value is considered as an optimal Q-value.

In accordance with the embodiments herein, the action-values are determined by taking into consideration an action performed by the reinforcement learning agent in a predetermined state, and under a predetermined policy. Further, for determining state-value functions, a value associated with each state of the reinforcement learning agent is determined, and represented as a state-value function. Further, for determining the reward values, the rewards obtained by the reinforcement learning agent for performing a predetermined action in a predetermined state are determined, and represented as reward values.

Referring to FIG. 7A, there is shown a reward function approximator denoted by the reference numeral 32. The reward function approximator 32 receives high-dimension sensory input training data (denoted by reference numeral 34) and reward labels (denoted by reference numeral 36). High dimension sensory input training data typically includes sensory data received from the environment in which the reinforcement learning processor 14 is installed. For example, if the reinforcement learning processor 14 is installed in a Printed Circuit Board (PCB), then the sensory data obtained from the environment described by the PCB includes images, videos, acoustics, audio, speech, temperature, pressure, digitized analog signals and the like. The sensory input training data is considered to be either favorable or non-favorable, and accordingly corresponding reward is calculated. The reward labels typically indicate the nature of the reward associated with the sensory input training data. For example, the rewards associated with the sensory input data could either be positive or negative or neutral (zero). In accordance with the embodiments herein, the reward function approximator 32 is configured to be implemented in 'two' predetermined modes, namely, training mode and inference mode. When implemented in training mode, the reward function approximator 32 is trained to approximate a reward function. When implemented in inference mode, the reward function approximator 32 provides rewards to the reinforcement learning processor 14. The reinforcement learning processor 14 stores the rewards thus obtained in the 'r-memory module' 16D.

Referring to FIG. 7B, there is shown an exemplary deep neural network 700 implementing the reward function approximator described in FIG. 7A. Reference numerals 44 and 46 denote high-dimension sensory input training data and reward labels respectively. Reference numeral 48A represents a connection between high-dimension sensory input training data 44 and reward labels 46 and neurons of the input layer 48 of the deep neural network 700. Reference numeral 50 represents the phase of 'feature extraction' from the high-dimension sensory input training data 44 and reward labels 46. Reference numeral 52 represents multiple hidden layers of the deep neural network 700 located in between the input layer 48 and the output layer 54. At the output layer 54, error correction (for the features extracted at the input layer 48) is performed. After the aforementioned process is iteratively executed for a predetermined number of times, the deep neural network 700 is executed in an inference mode to generate rewards that are transmitted to the reinforcement learning processor 14. The reinforcement learning processor 14 stores the rewards thus obtained in the 'r-memory module' 16D.

Under certain circumstances enough data might not be available for training a convolutional neural network or a recursive neural network. In such scenarios, a Generative Adversarial Network (GAN) is utilized for reward function approximation. As shown in FIG. 7C, a GAN is communicably coupled with a first database 56 storing the features of rewards generated thus far (also referred to as 'latent reward space'). A reward signal is generated based on the analysis of the databases 56 storing the features of rewards generated thus far. The reward signal is subsequently fed to a reward generator 58. The reward generator 58 outputs a reward (referred to as 'generated reward' hereafter) that is generated based on the latent reward space. Subsequently, a discriminator 60 compares the generated reward with 'real rewards' stored in a second database 56A. The discriminator 60 compares the generated rewards with the real rewards, and generates a function representative of an error rate between the generated rewards and real rewards. The error rate thus obtained is fed back to the reward generator 58 for error correction, via a feedback loop (shown in dotted lines in FIG. 7C). The function representing the error rate is iteratively determined until the error rate reduces to a value lesser than a predetermined threshold (the threshold calculated based on error type and error quantity), the training of the GAN is temporarily suspended. Subsequently, the output provided by the GAN is treated as reward signal, and is transmitted to the reinforcement learning processor 14. The reinforcement learning processor 14 stores the rewards represented by the reward signal, in the 'r-memory module' 16D.

FIG. 8 illustrates a programmable CISFD generating thread blocks. In accordance with an embodiment herein, at least of the instructions is fetched from IRAM by using a complex instruction fetch and decode (CISFD) unit. The opcode decoder decodes the instruction, and forwards the decoded instructions to instruction parser. A generic/programmable agent is defined and programmed using the instructions. While parsing instructions, the opcode directs to a memory address of an agent vector. The agent vector type is defined by the operations corresponding to the instruction. A plurality of predetermined threads and programmable agents are generated by a thread generator lookup RAM corresponding to decoded instruction. The instruction parser maps the threads generated with decoded instructions to generate a plurality of thread blocks of r, v, q, g threads and agent types. Further, the threads are embedded with one of the reinforcement learning agent ID vector and reinforcement learning environment ID vector associated with corresponding instruction.

According to an embodiment herein, the SIMA based vector instructions are used for indirect memory addressing. Instead of using Agent ID as an operand, the SIMA based vector instruction includes a memory address vector as operand. The memory address vector points to location of vector of Agent IDs stored in the memory. The memory address reads an array of agent IDs and the instruction is executed upon the arrays. In an example, a plurality of agent IDs can be grouped to execute the SIMA instructions. The instruction format for any SIMA instructions include:

Instruction opcode, <16 bit number of agents>, <32 bit memory location offset>.

According to an embodiment herein, the sequence of steps involved in the execution of SIMA based vector instructions include:
1. Fetch instructions from CISFD
2. Fetch agent vector from memory
3. Execute instructions by breaking the instructions into agent ID vectors indexed operations
4. Operations are stored into an Ops storage memory.

According to an embodiment herein, programmable agents are created using operations of SIMA based instructions. A programmable agent is defined in terms of operations (ops). The ops are stored in the ops memory. When creating agents, the following table is used to create agent.

TABLE 1

| User defined Agent type (16 bits) | Pointer to ops (8 bit) | Number of ops (4 bit) |
|---|---|---|
| 0000000000000000 | 00000000 | 0000 |

FIG. 9 is a flowchart illustrating a method for implementing reinforcement learning agents using a reinforcement learning processor. According to an embodiment herein, at least one reinforcement learning agent and at least one corresponding reinforcement learning environment is created using a first processor. A reinforcement learning agent ID is assigned to said reinforcement learning agent, and a reinforcement learning environment ID is assigned to said reinforcement learning environment (1100). Further, an application-domain specific instruction set (ASI) is created (1102). The application-domain specific instruction set comprises vector based instructions for implementing reinforcement learning agents and reward functions (1104). Further, instructions are created by incorporating at least one of the reinforcement learning agent ID vectors, the reinforcement learning environment ID vectors, and length of vector as an operand, and wherein the reinforcement learning agent ID vectors and the reinforcement learning environment ID vectors are pointers to a base address of an operations memory (1106). Thereafter, at least one of said instructions is fetched using a complex instruction fetch and decode (CISFD) unit, and said instruction is decoded. Agent vector is fetched from memory (1108). Further, at least one of said reinforcement learning agent ID vector and reinforcement learning environment ID vector is embedded into operations associated with the decoded instruction (1110). Subsequently, the instructions fetched by agent ID vector indexed operation are executed using a second processor, and the corresponding instruction is applied onto a group of reinforcement learning agents. The group of reinforcement learning environments are identified respectively by said reinforcement learning agent ID vector and reinforcement learning environment ID vector is embedded in the instruction (1112). Further, an action, a state-value function, a Q-value and a reward value are determined/estimated/derived based on execution of the instruction corresponding to the operation. The operations defined by the instructions are stored in an operations storage memory, wherein operations storage memory is a second memory (1114).

According to an embodiment herein, the step of creating an application-domain specific instruction set (ASI), further includes, the instructions for programmable agent implementation process defined by operations are included into the ASI, and wherein each agent is defined as a series of operation types. Each operation type is defined by an instruction of the reinforcement learning processor comprising linear algebra vector instructions, simple scalar instructions and register based load/store operations. The step of creating an application-domain specific instruction set (ASI), further includes, the instructions for implementing reward functions as a series of operations are incorporated into the ASI, and wherein reward functions are defined by a reward function ID in the reinforcement learning processor. Reward functions are associating to one of a reinforcement learning environment ID and reinforcement learning agent ID. The instructions are included for storing a micro code corresponding to a reward function into a second memory, represented by a reward function type, and a pointer to a base address of reward function ID in the operations memory. The step of creating an application-domain specific instruction set (ASI) is defined by a user-defined agent type, and a pointer to a base address of agent vector in the operations memory.

According to an embodiment herein, the pointers to operations include an agent table pointing to start address and number of operations (ops) in an ops table. Ops table further includes pointers to ops code to be executed from ops memory. In an example, Ops memory is an 8 KB register file that is capable of executing any type of operation. The Ops table includes definition and function of each operation stored in the ops memory. The reinforcement learning processor (RAP) supports a plurality of different ops, for example 256 operations. A plurality of operations are used to construct agents. Thus, with 8 KB of total instruction memory available for ops, any programmable agent is created. In an example, the maximum length of each ops is limited 8 bits.

FIG. 10 illustrates agent implementation operation by a reinforcement learning processor. With respect to FIG. 10, the agent type in the table points to ops in the local ops memory. The Ops are instruction macros derived from current instructions. Once the agent type obtains each of its ops, it points to optype in the optype table. The ops type is programmable by user using SIMA instructions. The ops type is boot time programmable or host can program it in run time. The optype table include address to the base instruction of the SIMA ISA to be executed. The base instructions are stored in a replicated ops memory. Thus, by providing flexibility to program the agent types using ops, any type of agent is created in future. This also provides massive programmability with SIMA based computing. A separate ops executable by the reinforcement learning processor with operand as agent ID vectors, agent specific operations are achieved. The agent specific operations are implemented as neural net operation with efficiency in memory access.

FIG. 11 illustrates a reward function implementation by the reinforcement learning processor. The method of implementing reward functions as a series of operations include defining reward functions by a reward function ID in the reinforcement learning processor. Thereafter, the reward functions are associated to one of a reinforcement learning environment ID and reinforcement learning agent ID. Also, a micro code corresponding to a reward function is stored into a second memory. The microcode is represented by a reward function type, and a pointer to a base address of reward function ID in the operations memory.

According to an embodiment herein, reward functions are programmable by vector based SIMA instructions. The program is further pointed by the reward function type. When an agent is association with a reward function, the set of programs corresponding to reward function is executed.

What is claimed is:

1. A computer-implemented system for implementing reinforcement learning agents using a reinforcement learning processor, said system comprising:
  a first processor configured to create at least one reinforcement learning agent and at least one corresponding reinforcement learning environment, said first processor further configured to assign a reinforcement learning agent ID to said reinforcement learning agent, and a reinforcement learning environment ID to said reinforcement learning environment;
  a first memory module communicably coupled to said first processor, said first memory module configured to store an application-domain specific instruction set (ASI), and wherein said application-domain specific instruction set comprises instructions for reinforcement learning operations and implementing reinforcement learning agents, and wherein each of said instructions comprises at least one of a pointer to reinforcement learning agent ID vector and a pointer to reinforcement learning environment ID vector as an operand;
  a complex instruction fetch and decode (CISFD) unit communicably coupled to said memory module, said CISFD unit configured to decode at least one of said instructions, and generate a plurality of predetermined threads corresponding to decoded instruction, said CISFD unit still further configured to embed into the predetermined threads, at least one of said reinforcement learning agent ID and reinforcement learning environment ID associated with the decoded instruction;
  a second processor configured to execute said predetermined reinforcement learning operations, said second processor comprising a plurality of cores, said second processor configured to process each of said predetermined threads in parallel using said plurality of cores, and apply a corresponding instruction onto at least one of a reinforcement learning agent and reinforcement learning environment identified by the reinforcement learning agent ID and reinforcement learning environment ID embedded in said predetermined threads, said second processor further configured to determine actions, a state-value function, a Q-value and a reward value, based on execution of the instructions corresponding to said predetermined threads;
  a second memory module cooperating with said second processor and partitioned into a plurality of memory partitions, each of said memory partitions respectively storing said actions, state-value function, Q-value and reward value, wherein the second memory module is an operations storage memory with a vector of agent IDs stored thereupon.

2. The system as claimed in claim 1, wherein said second processor is configured to execute the instructions corresponding to reinforcement learning operations to:

trigger said reinforcement learning agent to interact with said reinforcement learning environment and enable said reinforcement learning agent to:

explore said reinforcement learning environment to deduce relevant learning therefrom; and apply deduced relevant learning onto said reinforcement learning environment;

trigger said reinforcement learning agent to exploit gathered learnings by further interacting with said reinforcement learning environment;

construct at least one of a Markov Decision Process (MDP) and Semi-Markov Decision Process (SMDP) based on an interaction between said reinforcement learning agent and said reinforcement learning environment;

selectively update said MDP and SMDP, based on learning achieved from the interaction between said reinforcement learning agent and said reinforcement learning environment;

selectively create a backup of the MDP representative of the interaction between said reinforcement learning agent and said reinforcement learning environment;

initiate a q-learning procedure on the reinforcement learning agent;

associate a reward function with said reinforcement learning agent;

enable said reinforcement learning agent to interact with said reinforcement learning environment for a predetermined time period;

read a context corresponding to the reinforcement learning agent, and read the context corresponding to the reinforcement learning environment, and store the read context;

initiate a predetermined deep-learning operation on the reinforcement learning agent;

determine the optimal Q-value corresponding to a current state of the reinforcement learning agent;

implement generalized policy iteration (GPI);

implement on-policy and off-policy learning methods on said reinforcement learning agent;

approximate a state-value function for the current state of the reinforcement learning agent, and determine an optimal state-value function for the current state of the reinforcement learning agent; and fetch Q-values, state-value functions and reward values corresponding to the reinforcement learning agent, from the corresponding memory partitions of the second memory module.

3. The system as claimed in claim 1, wherein said second processor is configured to execute the instructions corresponding to implementing reinforcement learning agents to:

model an environment for a group of reinforcement learning agents represented by the reinforcement learning agent ID vector, wherein the instruction is defined by a 'n' bit agent type, a pointer to a base address of reinforcement learning agent, and the agent ID vector in the operations memory; and perform an optimum value-function approximation for a current state of MDP of a reinforcement learning agent 'k', for the reinforcement learning agent represented by a 'n' bit agent type, a pointer to a base address of reinforcement learning agent and the agent ID vector in the operations memory.

4. The system as claimed in claim 1, wherein said processor is configured to execute the instructions to:

implement reward functions as a series of operations, and wherein reward functions are defined by a reward function ID in the reinforcement learning processor; and associating reward functions to one of a reinforcement learning environment ID and reinforcement learning agent ID.

5. The system as claimed in claim 1, wherein said second processor is configured to execute the instructions corresponding to implementing reinforcement learning agents to:

perform programmable agent implementation defined by operations, and wherein each agent is configured to execute a series of operation types and wherein each operation type is defined by an instruction of the reinforcement learning processor and wherein each operation type comprises linear algebra vector instructions, simple scalar instructions and register based load/store operations.

6. The system as claimed in claim 1, wherein said plurality of predetermined threads generated by said CISFD are indicative of the interaction between said reinforcement learning agent and said reinforcement learning environment, and wherein said plurality of predetermined threads includes at least an r-thread, q-thread, v-thread and an a-thread, and wherein each of said predetermined threads is identifiable via corresponding thread ID, and wherein said second memory module is partitioned into a plurality of memory partitions, and wherein said memory partitions include an r-memory module, q-memory module, v-memory module, a-memory module, and wherein said second processor is further configured to execute said r-thread, q-thread, v-thread and a-thread, and generate said reward value, Q-value, state-value function and actions respectively, and wherein, said q-memory module is further bifurcated into a plurality of corresponding memory banks, and wherein each of said memory banks store Q-values, and wherein said Q-values are generated using a state-action function representative of each state of said reinforcement learning agent and an action performed by said reinforcement learning agent in said state, and wherein said Q-values are segregated amongst said plurality of corresponding memory banks based on corresponding states and actions.

7. The system as claimed in claim 5, wherein said r-memory module is configured to store reward values, and wherein said reward values are indicative of rewards obtained by said reinforcement learning agent for performing a predetermined action in a predetermined state, within said reinforcement learning environment, and wherein said v-memory module is configured to store state-value functions corresponding to each state of said reinforcement learning agent, and wherein said state-value function is indicative of a value associated with each state of the reinforcement learning agent, and wherein said a-memory module is configured to store an action performed by said reinforcement learning agent in a predetermined state, and under a predetermined policy, and and wherein said second processor extracts the Q-values from the plurality of corresponding memory banks based on the corresponding state and action, and compares the Q-values corresponding to every state and every action, to determine an optimal Q-value of said reinforcement learning agent.

8. A method for implementing reinforcement learning agents using a reinforcement learning processor, said method comprising following computer-implemented steps:

creating at least one reinforcement learning agent and at least one corresponding reinforcement learning environment using a first processor, and assigning a reinforcement learning agent ID to said reinforcement learning agent, and assigning a reinforcement learning environment ID to said reinforcement learning environment;

creating an application-domain specific instruction set (ASI), and wherein said application-domain specific instruction set comprises vector based instructions for implementing reinforcement learning agents and reward functions;

creating each of said instructions by incorporating at least one of the reinforcement learning agent ID vectors, the reinforcement learning environment ID vectors, and length of vector as an operand, and wherein the reinforcement learning agent ID vectors and the reinforcement learning environment ID vectors are pointers to a base address of an operations memory;

selectively fetching at least one of said instructions, using a complex instruction fetch and decode (CISFD) unit, and decoding said instruction, and fetching agent vector from memory;

embedding at least one of said reinforcement learning agent ID vector and reinforcement learning environment ID vector into operations associated with the decoded instruction;

executing the instructions by agent ID vector indexed operation using a second processor, and applying the corresponding instruction onto a group of reinforcement learning agents and a group of reinforcement learning environments identified respectively by said reinforcement learning agent ID vector and reinforcement learning environment ID vector embedded in the instruction, and determining an action, a state-value function, a Q-value and a reward value, based on execution of the instruction corresponding to the operation; and storing operations defined by the instructions in an operations storage memory, wherein operations storage memory is a second memory.

9. The method as claimed in claim 8, wherein the step of creating an application-domain specific instruction set (ASI), further includes the step of incorporating into the ASI, the instructions for programmable agent implementation defined by operations, wherein each agent is defined as a series of operation types.

10. The method as claimed in claim 9, wherein each operation type is defined by an instruction of the reinforcement learning processor comprising linear algebra vector instructions, simple scalar instructions and register based load/store operations.

11. The method as claimed in claim 8, wherein the step of creating an application-domain specific instruction set (ASI), further includes the step of incorporating into the ASI, the instructions for implementing reward functions as a series of operations, and wherein reward functions are defined by a reward function ID in the reinforcement learning processor, and associating reward functions to one of a reinforcement learning environment ID and reinforcement learning agent ID.

12. The method as claimed in claim 11, wherein the step of creating an application-domain specific instruction set (ASI), further includes the step of incorporating into the ASI, the instructions for storing a micro code corresponding to a reward function into a second memory, represented by a reward function type, and a pointer to a base address of reward function ID in the operations memory.

13. The method as claimed in claim 8, wherein the step of creating an application-domain specific instruction set (ASI) is defined by a user-defined agent type, and a pointer to a base address of agent vector in the operations memory.

14. The method as claimed in claim 8, wherein the step of creating an application-domain specific instruction set (ASI), further includes the step of incorporating into the ASI, the instructions for:

triggering said reinforcement learning agent to interact with said reinforcement learning environment and enabling said reinforcement learning agent to explore said reinforcement learning environment to deduce relevant learning therefrom, and apply deduced relevant learning onto said reinforcement learning environment;

triggering said reinforcement learning agent to exploit gathered learning by further interacting with said reinforcement learning environment;

constructing at least one of a Markov Decision Process (MDP) and Semi-Markov Decision Process (SMDP) based on interaction between said reinforcement learning agent and said reinforcement learning environment;

selectively updating said MDP and SMDP, based on learning achieved from the interaction between said reinforcement learning agent and said reinforcement learning environment;

selectively creating a backup of the MDP representative of the interaction between said reinforcement learning agent and said reinforcement learning environment;

initiating a q-learning procedure on the reinforcement learning agent;

associating a reward function with said reinforcement learning agent;

performing generalized policy iteration (GPI);

implementing on-policy and off-policy learning methods on said reinforcement learning agent;

enabling said reinforcement learning agent to interact with said reinforcement learning environment for a predetermined time period;

reading a context corresponding to the reinforcement learning agent, and reading the context corresponding to the reinforcement learning environment, and storing the read context;

initiating a predetermined deep-learning operation on the reinforcement learning agent represented by said reinforcement learning agent ID;

determining the optimal Q-value corresponding to a current state of the reinforcement learning agent;

fetching the Q-values, state-value functions, actions and reward values corresponding to the reinforcement learning agent, from the corresponding memory partitions of the second memory module; and approximating a state-value function for the current state of the reinforcement learning agent, and determining an optimal state-value function for the current state of the reinforcement learning agent.

15. The method as claimed in claim 8, wherein the step of creating an application-domain specific instruction set (ASI), further includes the step of incorporating into the ASI the instructions for:

modeling environment for a group of reinforcement learning agents represented by the reinforcement learning agent ID vector, and wherein the instruction is defined by a 'n' bit agent type, a pointer to a base address of reinforcement learning agent and the agent ID vector in the operations memory; and performing the optimum value-function approximation for a current state of MDP of a reinforcement learning agent 'k', for the reinforcement learning agent represented by a 'n' bit agent type, a pointer to a base address of reinforcement learning agent and the agent ID vector in the operations memory.

16. The method as claimed in claim 11, wherein the step of determining the reward values based on the execution of an r-thread, further includes the step of determining rewards obtained by said reinforcement learning agent for performing a predetermined action in a predetermined state, within said reinforcement learning environment, and storing said rewards as reward values.

17. A computer readable non-transitory storage medium having computer readable instructions stored thereupon, said computer readable instructions when executed by a computer processor, cause the computer processor to:
- creating at least one reinforcement learning agent and at least one corresponding reinforcement learning environment using a first processor, and assigning a reinforcement learning agent ID to said reinforcement learning agent, and assigning a reinforcement learning environment ID to said reinforcement learning environment;
- creating an application-domain specific instruction set (ASI), said application-domain specific instruction set comprising vector based instructions for implementing reinforcement learning agents and reward functions;
- creating each of said instructions by incorporating at least one of the reinforcement learning agent ID vectors, the reinforcement learning environment ID vectors, and length of vector as an operand, and wherein the reinforcement learning agent ID vectors and the reinforcement learning environment ID vectors are pointers to a base address of an operations memory;
- selectively fetching at least one of said instructions, using a complex instruction fetch and decode (CISFD) unit, and decoding said instruction, and fetching agent vector from memory;
- embedding at least one of said reinforcement learning agent ID vector and reinforcement learning environment ID vector into operations associated with the decoded instruction;
- executing the instructions fetched by agent ID vector indexed operation using a second processor, and applying the corresponding instruction onto a group of reinforcement learning agents and a group of reinforcement learning environments identified respectively by said reinforcement learning agent ID vector and reinforcement learning environment ID vector embedded in the instruction, and determining an action, a state-value function, a Q-value and a reward value, based on execution of the instruction corresponding to the operation; and
- storing operations defined by the instructions in an operations storage memory, wherein operations storage memory is a second memory.

18. The computer readable non-transitory storage medium as claimed in claim 17, wherein said computer readable instructions, when executed by the computer processor, further cause the computer processor to:
- model environment for a group of reinforcement learning agents represented by the reinforcement learning agent ID vector, and wherein the instruction is defined by a 'n' bit agent type, a pointer to a base address of reinforcement learning agent and the agent ID vector in the operations memory; and
- perform an optimum value-function approximation for a current state of MDP of a reinforcement learning agent 'k', for the reinforcement learning agent represented by a 'n' bit agent type, a pointer to a base address of reinforcement learning agent and the agent ID vector in the operations memory.

19. The computer readable non-transitory storage medium as claimed in claim 17, wherein said computer readable instructions, when executed by the processor, further cause the computer enabled device to:
- implement reward functions as a series of operations, and wherein reward functions are defined by a reward function ID in the reinforcement learning processor; and
- associate reward functions to one of a reinforcement learning environment ID and reinforcement learning agent ID.

* * * * *